US00RE40993E

(19) United States
(12) Reissued Patent
Westerman

(10) Patent Number: US RE40,993 E
(45) Date of Reissued Patent: Nov. 24, 2009

(54) SYSTEM AND METHOD FOR RECOGNIZING TOUCH TYPING UNDER LIMITED TACTILE FEEDBACK CONDITIONS

(75) Inventor: Wayne Carl Westerman, San Francisco, CA (US)

(73) Assignee: Apple Inc., Cupertino, CA (US)

(21) Appl. No.: 11/332,861

(22) Filed: Jan. 13, 2006

Related U.S. Patent Documents

Reissue of:
(64) Patent No.: 6,677,932
Issued: Jan. 13, 2004
Appl. No.: 09/681,146
Filed: Jan. 28, 2001

(51) Int. Cl.
*G06F 3/041* (2006.01)

(52) U.S. Cl. ..... 345/173; 345/168; 706/12; 382/181; 382/189

(58) Field of Classification Search ..... 345/156, 345/157, 168, 169, 171–173; 382/181, 187, 382/189; 706/12, 15, 17, 18, 20, 26
See application file for complete search history.

(56) References Cited

U.S. PATENT DOCUMENTS

| | | | | |
|---|---|---|---|---|
| 3,333,160 | A | 7/1967 | Gorski | |
| 3,541,541 | A | 11/1970 | Englebart | |
| 3,662,105 | A | 5/1972 | Hurst et al. | 178/18 |
| 3,798,370 | A | 3/1974 | Hurst | 178/18 |
| 4,246,452 | A | 1/1981 | Chandler | 200/5 |
| 4,550,221 | A | 10/1985 | Mabusth | 178/18 |
| 4,672,364 | A | 6/1987 | Lucas | 340/365 P |
| 4,672,558 | A | 6/1987 | Beckes et al. | 364/518 |
| 4,692,809 | A | 9/1987 | Beining et al. | 358/247 |
| 4,695,827 | A | 9/1987 | Beining et al. | 340/365 P |
| 4,733,222 | A | 3/1988 | Evans | 340/365 C |
| 4,734,685 | A | 3/1988 | Watanabe | 340/710 |
| 4,746,770 | A | 5/1988 | McAvinney | 178/18 |
| 4,771,276 | A | 9/1988 | Parks | 340/712 |
| 4,788,384 | A | 11/1988 | Bruere-Dawson et al. | 178/18 |
| 4,806,846 | A | 2/1989 | Kerber | 324/60 CD |
| 4,898,555 | A | 2/1990 | Sampson | 445/22 |
| 4,968,877 | A | 11/1990 | McAvinney et al. | 250/221 |
| 5,003,519 | A | 3/1991 | Noirjean | 368/73 |
| 5,017,030 | A | 5/1991 | Crews | 400/485 |
| 5,178,477 | A | 1/1993 | Gambaro | 400/489 |

(Continued)

FOREIGN PATENT DOCUMENTS

| | | | |
|---|---|---|---|
| CA | 1243096 | 10/1988 | 340/180 |

(Continued)

OTHER PUBLICATIONS

U.S. Pat. Appl. No. 10/654,108 filed Sep. 2, 2003 entitled "Ambidextrous Mouse".

(Continued)

*Primary Examiner*—Ricardo L Osorio
(74) *Attorney, Agent, or Firm*—Morrison & Foerster LLP

(57) ABSTRACT

A system is disclosed for recognizing typing from typing transducers that provide the typist with only limited tactile feedback of key position. The system includes a typing decoder sensitive to the geometric pattern of a keystroke sequence as well as the distance between individual finger touches and nearby keys. The typing decoder hypothesizes plausible key sequences and compares their geometric pattern to the geometric pattern of corresponding finger touches. It may also hypothesize home row key locations for touches caused by hands resting on or near home row. The resulting pattern match metrics may be combined with character sequence transition probabilities from a spelling model. The typing decoder then chooses the hypothesis sequence with the best cumulative match metric and sends it as key codes or commands to a host computing device.

38 Claims, 8 Drawing Sheets

U.S. PATENT DOCUMENTS

| | | | | |
|---|---|---|---|---|
| 5,189,403 | A | 2/1993 | Franz et al. | 340/711 |
| 5,194,862 | A | 3/1993 | Edwards | 341/20 |
| 5,224,861 | A | 7/1993 | Glass et al. | 434/35 |
| 5,241,308 | A | 8/1993 | Young | 341/34 |
| 5,252,951 | A | 10/1993 | Tannenbaum et al. | 345/156 |
| 5,281,966 | A | 1/1994 | Walsh | 341/22 |
| 5,305,017 | A | 4/1994 | Gerpheide | 345/174 |
| 5,345,543 | A | 9/1994 | Capps et al. | 395/137 |
| 5,376,948 | A | 12/1994 | Roberts | 345/173 |
| 5,398,310 | A | 3/1995 | Tchao et al. | 395/144 |
| 5,442,742 | A | 8/1995 | Greyson et al. | 395/146 |
| 5,463,388 | A | 10/1995 | Boie et al. | 341/33 |
| 5,463,696 | A | 10/1995 | Beernink et al. | 382/186 |
| 5,483,261 | A | 1/1996 | Yasutake | 345/173 |
| 5,488,204 | A | 1/1996 | Mead et al. | 178/18 |
| 5,495,077 | A | 2/1996 | Miller et al. | 178/18 |
| 5,513,309 | A | 4/1996 | Meier et al. | 395/155 |
| 5,523,775 | A | 6/1996 | Capps | 345/179 |
| 5,530,455 | A | 6/1996 | Gillick et al. | 345/163 |
| 5,543,590 | A | 8/1996 | Gillespie et al. | 178/18 |
| 5,543,591 | A | 8/1996 | Gillespie et al. | 178/18 |
| 5,563,632 | A | 10/1996 | Roberts | 345/173 |
| 5,563,996 | A | 10/1996 | Tchao | 395/144 |
| 5,565,658 | A | 10/1996 | Gerpheide et al. | 178/19 |
| 5,579,036 | A | 11/1996 | Yates, IV | 345/173 |
| 5,581,681 | A | 12/1996 | Tchao et al. | 395/804 |
| 5,583,946 | A | 12/1996 | Gourdol | 382/187 |
| 5,590,219 | A | 12/1996 | Gourdol | 382/202 |
| 5,592,566 | A | 1/1997 | Pagallo et al. | 382/187 |
| 5,594,810 | A | 1/1997 | Gourdol | 382/187 |
| 5,596,694 | A | 1/1997 | Capps | 395/152 |
| 5,612,719 | A | 3/1997 | Beernink et al. | 345/173 |
| 5,631,805 | A | 5/1997 | Bonsall | 361/681 |
| 5,633,955 | A | 5/1997 | Bozinovic et al. | 381/187 |
| 5,634,102 | A | 5/1997 | Capps | 395/334 |
| 5,636,101 | A | 6/1997 | Bonsall et al. | 361/681 |
| 5,642,108 | A | 6/1997 | Gopher et al. | 341/22 |
| 5,644,657 | A | 7/1997 | Capps et al. | 382/229 |
| 5,666,113 | A | 9/1997 | Logan | 341/34 |
| 5,666,502 | A | 9/1997 | Capps | 345/352 |
| 5,666,552 | A | 9/1997 | Grayson et al. | 395/802 |
| 4,968,877 | A | 11/1990 | McAvinney et al. | 250/221 |
| 5,003,519 | A | 3/1991 | Noirjean | 368/73 |
| 5,017,030 | A | 5/1991 | Crews | 400/485 |
| 5,178,477 | A | 1/1993 | Gambaro | 400/489 |
| 5,189,403 | A | 2/1993 | Franz et al. | 340/711 |
| 5,194,862 | A | 3/1993 | Edwards | 341/20 |
| 5,224,861 | A | 7/1993 | Glass et al. | 434/35 |
| 5,241,308 | A | 8/1993 | Young | 341/34 |
| 5,252,951 | A | 10/1993 | Tannenbaum et al. | 345/156 |
| 5,281,966 | A | 1/1994 | Walsh | 341/22 |
| 5,305,017 | A | 4/1994 | Gerpheide | 345/174 |
| 5,345,543 | A | 9/1994 | Capps et al. | 395/137 |
| 5,376,948 | A | 12/1994 | Roberts | 345/173 |
| 5,398,310 | A | 3/1995 | Tchao et al. | 395/144 |
| 5,442,742 | A | 8/1995 | Greyson et al. | 395/146 |
| 5,463,388 | A | 10/1995 | Boie et al. | 341/33 |
| 5,463,696 | A | 10/1995 | Beernink et al. | 382/186 |
| 5,483,261 | A | 1/1996 | Yasutake | 345/173 |
| 5,488,204 | A | 1/1996 | Mead et al. | 178/18 |
| 5,495,077 | A | 2/1996 | Miller et al. | 178/18 |
| 5,513,309 | A | 4/1996 | Meier et al. | 395/155 |
| 5,523,775 | A | 6/1996 | Capps | 345/179 |
| 5,530,455 | A | 6/1996 | Gillick et al. | 345/163 |
| 5,543,590 | A | 8/1996 | Gillespie et al. | 178/18 |
| 5,543,591 | A | 8/1996 | Gillespie et al. | 178/18 |
| 5,563,632 | A | 10/1996 | Roberts | 345/173 |
| 5,563,996 | A | 10/1996 | Tchao | 395/144 |
| 5,565,658 | A | 10/1996 | Gerpheide et al. | 178/19 |
| 5,579,036 | A | 11/1996 | Yates, IV | 345/173 |
| 5,581,681 | A | 12/1996 | Tchao et al. | 395/804 |
| 5,583,946 | A | 12/1996 | Gourdol | 382/187 |
| 5,590,219 | A | 12/1996 | Gourdol | 382/202 |
| 5,592,566 | A | 1/1997 | Pagallo et al. | 382/187 |
| 5,594,810 | A | 1/1997 | Gourdol | 382/187 |
| 5,596,694 | A | 1/1997 | Capps | 395/152 |
| 5,612,719 | A | 3/1997 | Beernink et al. | 345/173 |
| 5,631,805 | A | 5/1997 | Bonsall | 361/681 |
| 5,633,955 | A | 5/1997 | Bozinovic et al. | 381/187 |
| 5,634,102 | A | 5/1997 | Capps | 395/334 |
| 5,636,101 | A | 6/1997 | Bonsall et al. | 361/681 |
| 5,642,108 | A | 6/1997 | Gopher et al. | 341/22 |
| 5,644,657 | A | 7/1997 | Capps et al. | 382/229 |
| 5,666,113 | A | 9/1997 | Logan | 341/34 |
| 5,666,502 | A | 9/1997 | Capps | 345/352 |
| 5,666,552 | A | 9/1997 | Grayson et al. | 395/802 |
| 5,675,361 | A | 10/1997 | Santilli | 345/168 |
| 5,677,710 | A | 10/1997 | Thompson-Rohrlich | 345/173 |
| 5,689,253 | A | 11/1997 | Hargreaves et al. | 341/22 |
| 5,710,844 | A | 1/1998 | Capps et al. | 382/317 |
| 5,729,250 | A | 3/1998 | Bishop et al. | 345/175 |
| 5,730,165 | A | 3/1998 | Philipp | 137/1 |
| 5,736,976 | A | 4/1998 | Cheung | 345/168 |
| 5,741,990 | A | 4/1998 | Davies | 84/423 R |
| 5,745,116 | A | 4/1998 | Pisutha-Arnond | 345/358 |
| 5,745,716 | A | 4/1998 | Tchao et al. | 395/350 |
| 5,746,818 | A | 5/1998 | Yatake | 106/31.86 |
| 5,748,269 | A | 5/1998 | Harris et al. | 349/58 |
| 5,764,222 | A | 6/1998 | Shieh | 345/173 |
| 5,767,457 | A | 6/1998 | Gerpheide et al. | 178/18 |
| 5,767,842 | A | 6/1998 | Korth | 345/168 |
| 5,790,104 | A | 8/1998 | Shieh | 345/173 |
| 5,790,107 | A | 8/1998 | Kasser et al. | 345/174 |
| 5,802,516 | A | 9/1998 | Shwarts et al. | 707/6 |
| 5,808,567 | A | 9/1998 | McCloud | 341/20 |
| 5,809,267 | A | 9/1998 | Moran et al. | 395/358 |
| 5,812,698 | A * | 9/1998 | Platt et al. | 382/186 |
| 5,821,690 | A | 10/1998 | Martens et al. | 313/506 |
| 5,821,930 | A | 10/1998 | Hansen | 345/340 |
| 5,823,782 | A | 10/1998 | Marcus et al. | 434/156 |
| 5,825,351 | A | 10/1998 | Tam | 345/173 |
| 5,825,352 | A | 10/1998 | Bisset et al. | 345/173 |
| 5,854,625 | A | 12/1998 | Frisch et al. | 345/173 |
| 5,880,411 | A | 3/1999 | Gillespie et al. | 178/18.01 |
| 5,898,434 | A | 4/1999 | Small et al. | 345/348 |
| 5,920,309 | A | 7/1999 | Bisset et al. | 345/173 |
| 5,923,319 | A | 7/1999 | Bishop et al. | 345/175 |
| 5,933,134 | A | 8/1999 | Shieh | 345/173 |
| 5,943,044 | A | 8/1999 | Martinelli et al. | 345/174 |
| 6,002,389 | A | 12/1999 | Kasser | 345/173 |
| 6,002,808 | A | 12/1999 | Freeman | 382/288 |
| 6,020,881 | A | 2/2000 | Naughton et al. | 345/327 |
| 6,031,524 | A | 2/2000 | Kunert | 345/173 |
| 6,037,882 | A | 3/2000 | Levy | 341/20 |
| 6,050,825 | A | 4/2000 | Nichol et al. | 434/227 |
| 6,052,339 | A | 4/2000 | Frenkel et al. | 368/230 |
| 6,072,494 | A | 6/2000 | Nguyen | 345/358 |
| 6,084,576 | A | 7/2000 | Leu et al. | 345/168 |
| 6,107,997 | A | 8/2000 | Ure | 345/173 |
| 6,128,003 | A | 10/2000 | Smith et al. | 345/157 |
| 6,131,299 | A | 10/2000 | Raab et al. | 33/503 |
| 6,135,958 | A | 10/2000 | Mikula-Curtis et al. | 600/443 |
| 6,137,908 | A * | 10/2000 | Rhee | 382/187 |
| 6,144,380 | A | 11/2000 | Schwarts et al. | 345/350 |
| 6,188,391 | B1 | 2/2001 | Seely et al. | 345/173 |
| 6,198,515 | B1 | 3/2001 | Cole | 348/836 |
| 6,208,329 | B1 | 3/2001 | Ballare | 345/173 |
| 6,222,465 | B1 | 4/2001 | Kumar et al. | 341/20 |
| 6,239,790 | B1 | 5/2001 | Martinelli et al. | 345/174 |
| 6,243,071 | B1 | 6/2001 | Shwarts et al. | 345/146 |
| 6,246,862 | B1 | 6/2001 | Grivas et al. | 455/90 |

| | | | | |
|---|---|---|---|---|
| 6,249,606 | B1 | 6/2001 | Kiraly et al. | 382/195 |
| 6,288,707 | B1 | 9/2001 | Philipp | 345/168 |
| 6,289,326 | B1 | 9/2001 | LaFleur | 705/702 |
| 6,292,178 | B1 | 9/2001 | Bernstein et al. | 345/173 |
| 6,323,846 | B1 * | 11/2001 | Westerman et al. | 345/173 |
| 6,347,290 | B1 | 2/2002 | Bartlett | 702/150 |
| 6,377,009 | B1 | 4/2002 | Philipp | 318/468 |
| 6,378,234 | B1 * | 4/2002 | Luo | 341/22 |
| 6,380,931 | B1 | 4/2002 | Gillespie et al. | 345/173 |
| 6,411,287 | B1 | 6/2002 | Scharff et al. | 345/177 |
| 6,414,671 | B1 | 7/2002 | Gillespie et al. | 345/157 |
| 6,421,234 | B1 | 7/2002 | Ricks et al. | 361/683 |
| 6,452,514 | B1 | 9/2002 | Philipp | 341/33 |
| 6,457,355 | B1 | 10/2002 | Philipp | 73/304 |
| 6,466,036 | B1 | 10/2002 | Philipp | 324/678 |
| 6,515,669 | B1 | 2/2003 | Mohri | 345/474 |
| 6,525,749 | B1 | 2/2003 | Moran et al. | 345/863 |
| 6,535,200 | B2 | 3/2003 | Philipp | 345/168 |
| 6,543,684 | B1 | 4/2003 | White et al. | 234/379 |
| 6,543,947 | B2 | 4/2003 | Lee | 400/489 |
| 6,570,557 | B1 | 5/2003 | Westerman et al. | 345/173 |
| 6,593,916 | B1 | 7/2003 | Aroyan | 345/173 |
| 6,610,936 | B2 | 8/2003 | Gillespie et al. | 178/18.01 |
| 6,624,833 | B1 | 9/2003 | Kumar et al. | 345/863 |
| 6,639,577 | B2 | 10/2003 | Eberhard | 345/102 |
| 6,650,319 | B1 | 11/2003 | Hurst et al. | 345/173 |
| 6,658,994 | B1 | 12/2003 | McMillan | 99/468 |
| 6,670,894 | B2 | 12/2003 | Mehring | 341/22 |
| 6,677,932 | B1 | 1/2004 | Westerman | 345/173 |
| 6,677,934 | B1 | 1/2004 | Blanchard | 345/173 |
| 6,724,366 | B2 | 4/2004 | Crawford | 345/157 |
| 6,757,002 | B1 | 6/2004 | Oross et al. | 345/864 |
| 6,803,906 | B1 | 10/2004 | Morrison et al. | 345/173 |
| 6,842,672 | B1 | 1/2005 | Straub et al. | 701/3 |
| 6,856,259 | B1 | 2/2005 | Sharp | 341/5 |
| 6,888,536 | B2 | 5/2005 | Westerman et al. | 345/173 |
| 6,900,795 | B1 | 5/2005 | Knight, III et al. | 345/173 |
| 6,927,761 | B2 | 8/2005 | Badaye et al. | 345/173 |
| 6,942,571 | B1 | 9/2005 | McAllister et al. | 463/20 |
| 6,965,375 | B1 | 11/2005 | Gettemy et al. | 345/173 |
| 6,972,401 | B2 | 12/2005 | Akitt et al. | 250/221 |
| 6,977,666 | B1 | 12/2005 | Hedrick | 345/690 |
| 6,985,801 | B1 | 1/2006 | Straub et al. | 701/3 |
| 6,992,659 | B2 | 1/2006 | Gettemy | 345/173 |
| 7,031,228 | B2 | 4/2006 | Born et al. | 368/69 |
| 2002/0118848 | A1 | 8/2002 | Karpenstein | 381/119 |
| 2003/0006974 | A1 | 1/2003 | Clough et al. | 345/179 |
| 2003/0076301 | A1 | 4/2003 | Tsuk et al. | 345/159 |
| 2003/0076303 | A1 | 4/2003 | Huppi | 345/163 |
| 2003/0076306 | A1 | 4/2003 | Zadesky et al. | 345/173 |
| 2003/0095095 | A1 | 5/2003 | Pihlaja | 345/156 |
| 2003/0095096 | A1 | 5/2003 | Robbin et al. | 345/156 |
| 2003/0098858 | A1 | 5/2003 | Perski et al. | 345/173 |
| 2003/0206202 | A1 | 11/2003 | Moriya et al. | 345/846 |
| 2003/0234768 | A1 | 12/2003 | Rekimoto et al. | 345/169 |
| 2004/0263484 | A1 | 12/2004 | Montysalo et al. | 345/173 |
| 2005/0012723 | A1 | 1/2005 | Pallakoff | 345/173 |
| 2005/0052425 | A1 | 3/2005 | Zadesky et al. | 345/173 |
| 2005/0104867 | A1 | 5/2005 | Westerman et al. | 345/173 |
| 2005/0110768 | A1 | 5/2005 | Marriott et al. | 345/173 |
| 2006/0022955 | A1 | 2/2006 | Kennedy | 345/173 |
| 2006/0022956 | A1 | 2/2006 | Lengeling et al. | 345/173 |
| 2006/0026521 | A1 | 2/2006 | Hotelling et al. | 715/702 |
| 2006/0026535 | A1 | 2/2006 | Hotelling et al. | 715/863 |
| 2006/0026536 | A1 | 2/2006 | Hotelling et al. | 715/863 |
| 2006/0032680 | A1 | 2/2006 | Elias et al. | 178/18.06 |
| 2006/0033724 | A1 | 2/2006 | Chaudhri et al. | 345/173 |
| 2006/0053387 | A1 | 3/2006 | Ording | 715/773 |
| 2006/0066582 | A1 | 3/2006 | Lyon et al. | 345/173 |
| 2006/0085757 | A1 | 4/2006 | Andre et al. | 715/771 |
| 2006/0097991 | A1 | 5/2006 | Hotelling et al. | 345/173 |
| 2006/0197753 | A1 | 9/2006 | Hotelling | 345/173 |

FOREIGN PATENT DOCUMENTS

| | | |
|---|---|---|
| DE | 102 51 296 | 5/2004 |
| EP | 0 288 692 | 7/1993 |
| EP | 0 664 504 | 1/1995 |
| EP | 0 464 908 | 9/1996 |
| EP | 1 014 295 | 1/2002 |
| WO | 97/018547 | 5/1997 |
| WO | 97/023738 | 7/1997 |
| WO | 98/14863 | 4/1998 |
| WO | 2003/088176 | 10/2003 |
| WO | 2006/023569 | 3/2006 |

OTHER PUBLICATIONS

U.S. Pat. Appl. No. 10/789,676 filed on Feb. 27, 2004 entitled "Shape Detecting Input Device".

"4–Wire Resistive Touchscreens" obtained from http://www.touchscreens.com/intro–touchtypes–4resistive.html generated Aug. 5, 2005.

"5–Wire Resistive Touchscreens" obtained from http://www.touchscreens.com/intro–touchtypes–resistive.html generated Aug. 5, 2005.

"A Brief Overview of Gesture Recognition" obtained from http://www.dai.ed.ac.uk/Cvonline/LOCA_COPIES/COHEN/gesture_overview.html, generated Apr. 20, 2004.

"Capacitive Touchscreens" obtained from http://www.touchscreens.com/intro–touchtypes–capacitive.html generated Aug. 5, 2005.

"Capacitive Position Sensing" obtained from http://www.synaptics.com/technology/cps.cfm generated Aug. 5, 2005.

"Comparing Touch Technologies" obtained from http://www.touchscreens.com/intro–touchtypes.html generated Oct. 10, 2004.

"Gesture Recognition" http://www.fingerworks.com/gesture_recognition.html.

"GlidePoint®" obtained from http://www.cirque.com/technology/technology_gp.html generated Aug. 5, 2005.

"How do touchscreen monitors know where you're touching?" obtained from http://www.electronics.howstuffworks.com/question716.html generated Aug. 5, 2005.

"How does a touchscreen work?" obtained from http://www.touchscreens.com/intro–anatomy.html generated Aug. 5, 2005.

"iGesture Products for Everyone (learn in minutes) Product Overview" FingerWorks.com.

"Infrared Touchscreens" obtained from http://www.touchscreens.com/intro–touchtypes–infrared.html generated Aug. 5, 2005.

"Mouse Emulation" FingerWorks obtained from http://www.fingerworks.com/gesture_guide_mouse.html generated Aug. 30, 2005.

"Mouse Gestures in Opera" obtained from http://www.opera.com/products/desktop/mouse/index.dml generated Aug. 30, 2005.

"Mouse Gestures," Optim oz, May 21, 2004.

"MultiTouch Overview" FingerWorks obtained from http://www.fingerworks.com/multoverview.html generated Aug. 30, 2005.

"Near Field Imaging Touchscreens" obtained from http://www.touchscreens.com/intro–touchtypes–nfi.html generated Aug. 5, 2005.

"PenTouch Capacitive Touchscreens" obtained from http://www.touchscreens.com/intro–touchtypes–pentouch.html generated Aug. 5, 2005.
"Surface Acoustic Wave Touchscreens" obtained from http://www.touchscreens.com/intro–touchtypes–saw.html generated Aug. 5, 2005.
"Symbol Commander" obtained from http://www.sensiva.com/symbolcomander/, generated Aug. 30, 2005.
"Tips for Typing" FingerWorks http://www.fingerworks.com/mini_typing.html generated Aug. 30, 2005.
"Touch Technologies Overview" 2001, 3M Touch Systems, Massachusetts.
"Wacom Components—Technology" obtained from http://www.wacom–components.com/english/tech.asp generated on Oct. 10, 2004.
"Watershed Algoritm" http://rsb.info.nih.gov/ij/plugins/watershed.html generated Aug. 5, 2005.
"FingerWorks—Gesture Guide—Application Switching," obtained from http://www.fingerworks.com/gesture_guide_apps.html, generated on Aug. 27, 2004, 1–pg.
"FingerWorks—Gesture Guide—Editing," obtained from http://www.fingerworks.com/gesture_guide_editing.html, generated on Aug. 27, 2004, 1 –pg.
"FingerWorks—Gesture Guide—File Operations," obtained from http://www.fingerworks.com/gesture_guide_files.html, generated on Aug. 27, 2004, 1 –pg.
"FingerWorks—Gesture Guide—Text Manipulation," obtained from http://www.fingerworks.com/gesture_guide_text_manip.html, generated on Aug. 27, 2004, 2 –pg.
"FingerWorks—Gesture Guide—Tips and Tricks," obtained from http://www.fingerworks.com/gesture_guide_tips.html, generated Aug. 27, 2004, 2 –pgs.
"FingerWorks—Gesture Guide—Web," obtained from http://www.fingerworks.com/gesture_guide_web.html, generated on Aug. 27, 2004, 1 –pg.
"FingerWorks—Guide to Hand Gestures for USB Touchpads," obtained from http://www.fingerworks.com/igesture_userguide.html, generated Aug. 27, 2004, 1 –pg.
"FingerWorks—iGesture—Technical Details," obtained from http://www.fingerworks.com/igesture_tech.html, generated Aug. 27, 2004, 1–pg.
"FingerWorks—The Only Touchpads with Ergonomic Full–Hand Resting and Relaxation!" obtained from http://www.fingerworks.com/resting.html, Copyright 2001, 1 –pg.
"FingerWorks—Tips for Typing on the Mini," obtained from http://www.fingerworks.com/mini_typing.html, generated on Aug. 27, 2004, 2 –pgs.
"iGesture Pad—the MultiFinger USB TouchPad with Whole–Hand Gestures," obtained from http://www.fingerworks.com/igesture.html, generated Aug. 27, 2004, 2 –pgs.
Bier, "Toolglass and Magic Lenses: The see–through interface" In James Kijiya, editor, Computer Graphics (SIGGRAPH '93 Proceedings), vol. 27, pp. 73–80, Aug. 1993.
Douglas et al., *The Ergonomics of Computer Pointing Devices* (1997).
European Search Report received in EP 1 621 989 @ *Beyer Weaver & Thomas*, LLP) dated Mar. 27, 2006.
EVB Elektronik "TSOP6238 IR Receiver Modules for Infrared Remote Control Systems" dated Jan. 2004 1 –pg.
Fisher et al., "Repetitive Motion Disorders: The Design of Optimal Rate—Rest Profiles," Human Factors, 35(2):283–304 (Jun. 1993).
Fukumoto et al., "ActiveClick: Tactile Feedback for Touch Panels," In CHI 2001 Summary, pp. 121–122, 2001.
Fukumoto and Yoshinobu Tonomura, "Body Coupled Fingering: Wireless Wearable Keyboard," *CHI 97*, pp. 147–154 (Mar. 1997).
Hardy, "Fingerworks" Mar. 7, 2002; BBC World On Line.
Hillier and Gerald J. Lieberman, *Introduction to Operations Research*, (1986).
International Search Report dated Mar. 3, 2006 (PCT/US 05/03325: 119–0052WO).
Jacob et al., "Integrality and Separability of Input Devices," *ACM Transactions on Computer–Human Interaction*, 1:3–26 (Mar. 1994).
Kinkley et al., "Touch–Sensing Input Devices," in CHI '99 Proceedings, pp. 223–230, 1999.
KIONX "KXP84 Series Summary Data Sheet" copyright 2005, dated Oct. 21, 2005, 4 –pgs.
Lee et al., "A Multi–Touch Three Dimensional Touch–Sensitive Tablet," in CHI '85 Proceedings, pp. 121–128, 2000.
Lee, "A Fast Multiple–Touch–Sensitive Input Device," Master's Thesis, University of Toronto (1984).
Matsushita et al., "Holo Wall: Designing a Finger, Hand, Body and Object Sensitive Wall," In Proceedings of UIST '97, Oct. 1997.
Quantum Research Group "QT510/QWheel™ Touch Slider IC" copyright 2004–2005, 14–pgs.
Quek, "Unencumbered Gestural Interaction," *IEEE Multimedia*, 3:36–47 (Winter 1996).
Radwin, "Activation Force and Travel Effects on Overexertion in Repetitive Key Tapping," *Human Factors*, 39(1):130–140 (Mar. 1997).
Rekimoto "SmartSkin: An Infrastructure for Freehand Manipulation on Interactive Surfaces" CHI 2002, Apr. 20–25, 2002.
Rekimoto et al., "ToolStone: Effective Use of the Physical Manipulation Vocabularies of Input Devices," In Proc. Of UIST 2000, 2000.
Rubine et al., "Programmable Finger–Tracking Instrument Controllers," *Computer Music Journal*, vol. 14, No. 1 (Spring 1990).
Rutledge et al., "Force–To–Motion Functions For Pointing," Human–Computer Interaction—INTERACT (1990).
Subatai Ahmad, "A Usable Real–Time 3D Hand Tracker," Proceedings of the 28$^{th}$ Asilomar Conference on Signals, Systems and Computers—Part 2 (of2), vol. 2 (Oct. 1994).
Texas Instruments "TSC2003/12C Touch Screen Controller" Data Sheet SBAS 162, dated Oct. 2001, 20 pgs.
Wellner, "The Digital Desk Calculators: Tangible Manipulation on a Desk Top Display" IN ACM UIST '91 Proceedings, pp. 27–34, Nov. 1991.
Williams, "Applications for a Switched–Capacitor Instrumentation Buiding Block" Linear Technology Application Note 3, Jul. 1985, pp. 1–16.
Yamada et al., "A Switched–Capacitor Interface for Capacitive Pressure Sensors" IEEE Transactions on Instrumentation and Measurement, vol. 41, No. 1, Feb. 1992, pp. 81–86.
Yeh et al., "Switched Capacitor Interface Circuit for Capacitive Transducers" 1985 IEEE.
Zhai et al., "Dual Stream Input for Pointing and Scolling," *Proceedings of CHI '97 Extended Abstracts*(1997).
Zimmerman et al., "Applying Electric Field Sensing to Human–Computer Interfaces," In CHI '85 Proceedings, pp. 280–287, 1995.
U.S. Appl. Ser. No. 10/774,053 filed on Feb. 5, 2004.

U.S. Appl. No. 11/140,529 filed on May 27, 2005 which is a Reissue of 6,570,557 listed above (see A152).
U.S. Appl. No. 11/381,313 filed on May 2, 2006 entitled "Multipoint Touch Surface Controller".
U.S. Appl. No. 11/332,861 filed on Jan. 13, 2006 which is a Reissue of 6,677,932 listed above (see A160).
U.S. Pat. Appl. No. 11/380,109 filed on Apr. 25, 2006 entitled "Keystroke Tactility Arrangement On Smooth Touch Surface."
U.S. Appl. No. 11/428,501 filed on Jul. 3, 2006 entitled "Capacitive Sensing Arrangement," which is a Continuation of US 2005/0104867 listed above (see A177).
U.S. Appl. No. 11/428,503 filed on Jul. 3, 2006 entitled "Touch Surface" which is a Continuation of US 2005/0104867 listed above (see A177).
U.S. Appl. No. 11/428,506 filed on Jul. 3, 2006 entitled "User Interface Gestures" which is a Continuation of U.S. 2005/0104867 listed above (see A177).
U.S. Appl. No. 11/428,515 filed on Jul. 3, 2006 entitled "User Interface Gestures" which is a Continuation of U.S. 2005/0104867 listed above (see A177).
U.S. Appl. No. 11/428,522 filed on Jul. 3, 2006 entitled "Identifying Contacts on a Touch Surface" which is a Continuation of U.S. 2005/0104867 listed above (see A177).
U.S. Appl. No. 11/428,521 filed on Jul. 3, 2006 entitled "Identifying Contacts on a Touch Surface" which is a Continuation of U.S. 2005/0104867 listed above (see A177).
U.S. Appl. No. 11/426,078 filed on Jun. 23, 2006 entitled "Electronic Device Having Display and Surrounding Touch Sensitive Bezel For User Interface and Control" which is a Continuation–In–Part of 2006/0197753 listed above (see A181).
U.S. Appl. No. 11/278,080 filed on Mar. 30, 2006 entitled "Force Imaging Input Device and System".
U.S. Appl. No. 11/382,402 filed on May 9, 2006 entitled "Force and Location Sensitive Display" which is a Continuation of 11/278,080 listed above (see C81).
International Search Report received in corresponding PCT application No. PCT/US2006/008349 dated Oct. 6, 2006.

* cited by examiner

SYSTEM AND METHOD FOR RECOGNIZING TOUCH TYPING UNDER LIMITED TACTILE FEEDBACK CONDITIONS

Matter enclosed in heavy brackets [ ] appears in the original patent but forms no part of this reissue specification; matter printed in italics indicates the additions made by reissue.

CROSS REFERENCE TO RELATED APPLICATIONS

Referenced-applications

Ser. No. 09/236,513 Jan. 1, 1999 U.S. Pat. No. 5,463,388 Jan. 29, 1993 U.S. Pat. No. 5,812,698 Jul. 14, 1997 U.S. Pat. No. 5,818,437 Jul. 26, 1995 U.S. Pat. No. 6,137,908 Jun. 29, 1994 U.S. Pat. No. 6,107,997 Jun. 27, 1996.

BACKGROUND OF THE INVENTION

1. Field of the Invention

The present invention pertains to typing recognition systems and methods, and more particularly to recognition of typing in air or on a relatively smooth surface that provides less tactile feedback than conventional mechanical keyboards.

2. The Related Art

Typists generally employ various combinations of two typing techniques: hunt and peck and touch typing. When hunting and pecking, the typist visually searches for the key center and strikes the key with the index or middle finger. When touch typing, the fingers initially rest on home row keys, each finger is responsible for striking a certain column of keys and the typist is discouraged from looking down at the keys. The contours and depression of mechanical keys provide strong tactile feedback that helps typists keep their fingers aligned with the key layout. The finger motions of touch typists are ballistic rather than guided by a slow visual search, making touch typing faster than hunt and peck. However, even skilled touch typists occasionally fall back on hunt and peck to find rarely-used punctuation or command keys at the periphery of the key layout.

Many touchscreen devices display pop-up or soft keyboards meant to be activated by lightly tapping a displayed button or key symbol with a finger or stylus. Touch typing is considered impractical on such devices for several reasons: a shrunken key layout may have a key spacing too small for each finger to be aligned with its own key column, the smooth screen surface provides no tactile feedback of finger/key alignment as keys are struck, and most touchscreens cannot accurately report finger positions when touched by more than one finger at a time. Such temporal touch overlap often occurs when typing a quick burst of keys with both hands, holding the finger on modifier keys while striking normal keys, or attempting to rest the hands. Thus users of touchscreen key layouts have had to fall back on a slow, visual search for one key at a time.

Since touchscreen and touch keyboard users are expected to visually aim for the center of each key, typing recognition software for touch surfaces can use one of two simple, nearly equivalent methods to decide which key is being touched. Like the present invention, these methods apply to devices that report touch coordinates interpolated over a fine grid of sensors rather than devices that place a single large sensor under the center of each key. In the first method, described in U.S. patent application Ser. No. 09/236,513 by Westerman and Elias, the system computes for each key the distance from key center to the sensed touch location. The software then selects the key nearest the finger touch. In the second method, described in U.S. Pat. No. 5,463,388 to Boie et al., the software establishes a rectangle or bounding box around each key and decides which, if any, bounding box the reported touch coordinates lie within. The former method requires less computation, and the latter method allows simpler control over individual key shape and guard bands between keys, but both methods essentially report the key nearest to the finger touch, independent of past touches. Hence we refer to them as 'nearest key' recognizers.

Unlike touchscreens, the multi-touch surface (MTS) described by Westerman and Elias in Ser. No. 09/236,513 can handle resting hands and temporal finger overlap during quick typing bursts. Since the MTS sensing technology is fully scalable, an MTS can easily be built large enough for a full-size QWERTY key layout. The only remaining barrier to fast touch typing on an MTS is the lack of tactile feedback. While it is possible to add either textures or compressibility to an MTS to enhance tactile feedback, there are two good reasons to keep the surface firm and smooth. First, any textures added to the surface to indicate key centers can potentially interfere with smooth sliding across the surface during multi-finger pointing and dragging operations. Second, the MTS proximity sensors actually allow zero-force typing by sensing the presence of a fingertip on the surface whether or not the finger applies noticeable downward pressure to the surface. Zero-force typing reduces the strain on finger muscles and tendons as each key is touched.

Without rich tactile feedback, the hands and individual fingers of an MTS touch typist tend to drift out of perfect alignment with the keys. Typists can limit the hand drift by anchoring their palms in home position on the surface, but many keystrokes will still be slightly off center due to drift and reach errors by individual fingers. Such hand drift and erroneous finger placements wreak havoc with the simple 'nearest key' recognizers disclosed in the related touchscreen and touch keyboard art. For example, if the hand alignment with respect to the key layout drifts by half a key-spacing (~9 mm or ⅜"), all keystrokes may land halfway between adjacent keys. A 'nearest key' recognizer is left to choose one of the two adjacent keys essentially at random, recognizing only 50% of the keystrokes correctly. A spelling model integrated into the recognizer can help assuming the typist intended to enter a dictionary word, but then actually hinders entry of other strings. Thus there exists a need in the touchscreen and touch keyboard art for typing recognition methods that are less sensitive to the hand drift and finger placement errors that occur without strong tactile feedback from key centers.

For many years, speech, handwriting, and optical character recognition systems have employed spelling or language models to help guess users' intended words when speech, handwriting, or other input is ambiguous. For example, in U.S. Pat. No. 5,812,698 Platt et al. teach a handwriting recognizer that analyzes pen strokes to create a list of probable character strings and then invokes a Markov language model and spelling dictionary to pick the most common English word from that list of potential strings. However, such systems have a major weakness. They assume all user input will be a word contained in their spelling or language model, actually impeding entry of words not anticipated by the model. Even if the user intentionally and unambiguously enters a random character string or foreign word not found in the system vocabulary, the system tries to interpret that input as one of its vocabulary words. The typical solution is to provide the user an alternative (often comparatively clumsy) process with which to enter or select strings outside the system vocabulary. For example, U.S. Pat. No. 5,818,437 to Grover et al. teaches use of a dictionary and vocabulary models to disambiguate text entered on a 'reduced' keyboard such as a telephone keypad that assigns multiple characters to each physical key. In cases that the most common dictionary word matching an input key sequence is not the desired word, users must select from a list of alternate strings. Likewise, users of speech recognition system typically fall back on a keyboard to enter words missing from the system's vocabulary.

Unfortunately, heavy reliance on spelling models and alternative entry processes is simply impractical for a general-purpose typing recognizer. Typing, after all, is the fallback entry process for many handwriting and speech recognition systems, and the only fallback conceivable for typing is a slower, clumsier typing mode. Likewise, personal computer users have to type into a wide variety of applications requiring strange character strings like passwords, filenames, abbreviated commands, and programming variable names. To avoid annoying the user with frequent corrections or dictionary additions, spelling model influence must be weak enough that strings missing from it will always be accepted when typed at moderate speed with reasonable care. Thus a general-purpose typing recognizer should only rely on spelling models as a last resort, when all possible measurements of the actual typing are ambiguous.

BRIEF SUMMARY OF THE INVENTION

Since a typing recognizer cannot depend too much on spelling models, there still exists a need in the touchscreen and touch keyboard art for spelling-independent methods to improve recognition accuracy. The main aspect of the present invention is to search for the geometric pattern of keys that best matches the geometric pattern of a touch sequence, rather than just searching for the key closest to each touch. This method improves recognition accuracy without any assumptions about the character content being typed.

According to this aspect of the invention, touch or finger stroke coordinates reported by a sensing device and key coordinates from a key layout feed into a typing recognizer module. The typing recognizer then hypothesizes plausible sequences of keys by extending existing sequences with keys that are within the immediate neighborhood of the newest finger touch. It can also hypothesize home row key locations for touches caused by hands resting on or near the home row keys. For each hypothesized sequence, the typing recognizer computes separation vectors between the layout position of successive keys in the sequence. The typing recognizer also computes separation vectors between successive touch positions in the touch sequence. Each key sequence is evaluated according to a pattern match metric that includes not only the distance between each finger touch and the corresponding key but also how closely the separation vectors between successive touches match the separation vectors between successive keys. The hypothesized sequence with the best cumulative match metric is transmitted to the host computer, possibly replacing an older, higher cost partial sequence that was transmitted previously.

It is therefore an objective of this invention to provide typing recognition methods that overcome the shortcomings of the related touchscreen and touch keyboard art.

A primary object of the present invention is to recognize typing accurately even when lack of tactile key position feedback leads to significant hand and finger drift.

Yet another objective of this invention is to improve typing recognition accuracy without excessive dependence on spelling models.

A further objective of this invention is to disambiguate typing as much as possible with measurements of its geometric pattern before falling back on a spelling model to resolve any remaining recognition ambiguities.

A secondary objective of this invention is to beneficially incorporate key/hand alignment measurements from resting hands into recognition decisions without explicitly shifting the key layout into alignment with the resting hands.

DETAILED DESCRIPTION OF THE INVENTION

Figure 1:
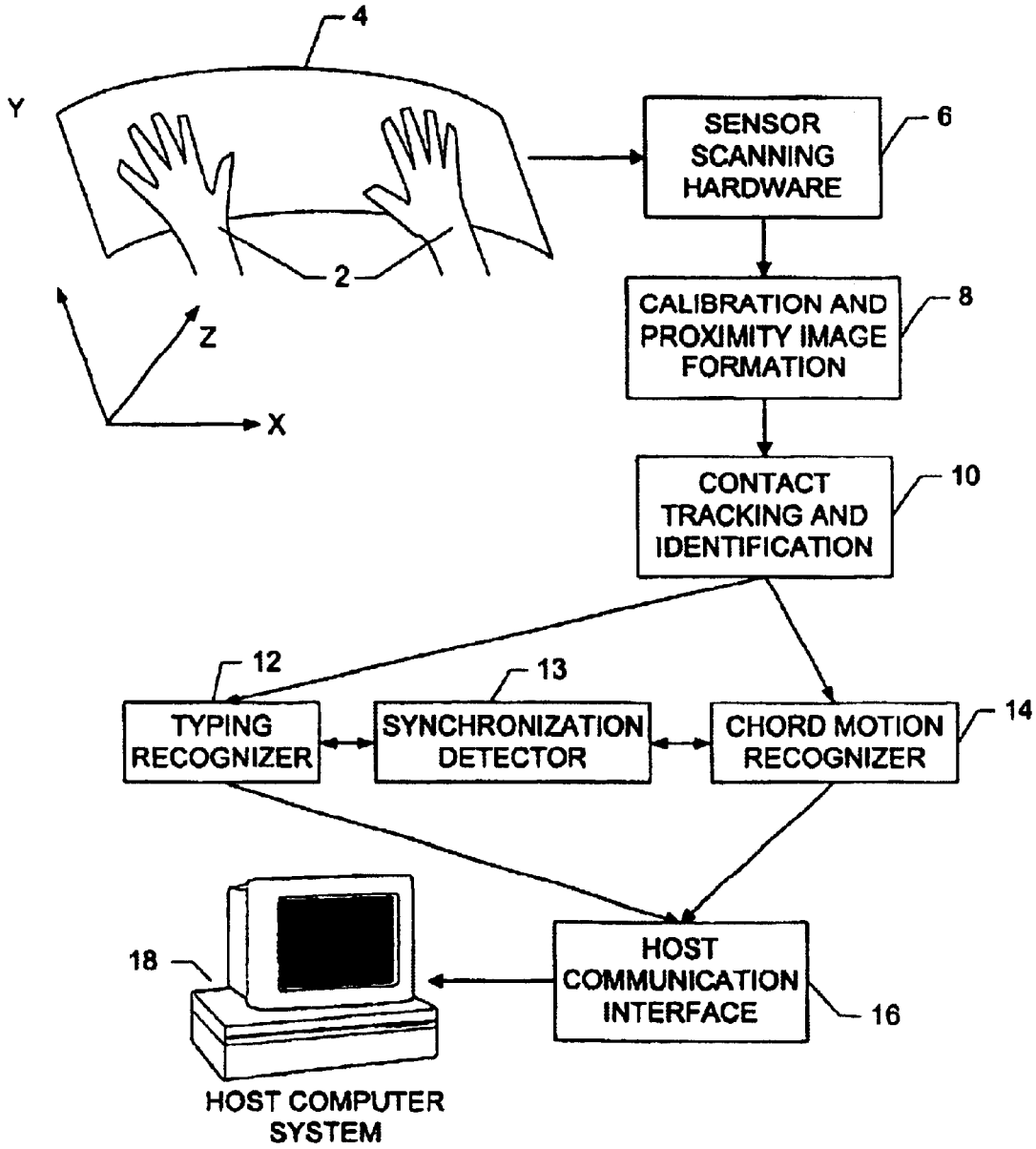
FIG. 1 is a block level diagram of the preferred surface typing detection and recognition system for the present invention.

In the preferred embodiment, the typing recognition methods of this invention are utilized within a multi-touch system like that shown in FIG. 1. The sensor scanning hardware 6 detects touches by fingers 2 on the surface 4. The proximity image formation 8 and contact tracking 10 modules determine the touch timing and surface coordinates and report these to the typing recognizer 12. The typing recognizer decides which keys the user intended to press and tells the host communications interface 16 to send those keys to the host computer 18. The system may also include a chord motion recognizer module 14 that interprets lateral sliding of multiple fingers as pointing or gesture input and effectively disables the typing recognizer for such touches. The synchronization detector 13 searches for simultaneous presses or releases of multiple fingers, thereby aiding in detection of chord slides, chord taps, and resting hands. All modules besides the typing recognizer are fully described in related U.S. patent application Ser. No. 09/236,513 by Westerman and Elias. That application is incorporated herein by reference in its entirety. The present invention constitutes improvements to the rudimentary 'nearest key' typing recognizer described in that application.

Those skilled in the art will recognize that the typing recognizer disclosed herein could be utilized with any sensing device that accurately reports the lateral position of fingertips as they near the end of their stroke, whether or not the fingers actually touch a surface of depress physical keys. Examples of such alternative finger position sensing systems include micro radar, data gloves, and pressure-sensitive surface materials. The term touch location will be used hereafter for the lateral position or x and y coordinates detected for fingertips within a plane roughly normal to the fingertips at the end of their stroke, even for sensing devices that require no physical contact with a surface at the end of the stroke. Likewise, the typing recognition software need not reside within a microprocessor packaged with the sensing device. It could just as easily execute within the host computer system, or the host computer system and sensing device might be combined such that the same microprocessor executes finger tracking, typing recognition, and user application software.

Related art 'nearest key' typing recognizers typically assume that touch location errors are independent from keystroke to keystroke. But for typing devices that don't provide strong tactile feedback of key position, the hand sometimes drifts slightly out of alignment with the key layout. This causes the absolute location errors for most touches to be biased in the drift direction and statistically dependent. However, if the typist still reaches the proper amount (a whole number of key spacings) relative to recent touches, the lateral separations between finger touches will closely match the separations between the keys the typist intended to strike, regardless of the overall hand drift.

A related type of bias occurs when individual fingers drift relative to the rest of the hand. This causes the absolute location errors to be biased the same way for all keys typed by the drifting finger(s). However, keys typed by adjacent fingers may not share this bias.

Figure 2A:
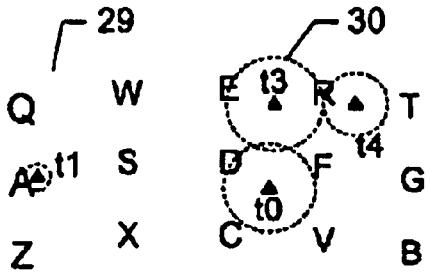
FIG. 2 contains illustrations of a sample touch sequence on the left half of a standard QWERTY key layout (FIG. 2A), the touch separation vectors for the sample touch sequence (FIG. 2B), and the key separation vectors for several hypothesized key sequences that might correspond to the key sequence intended by the touch typist (FIGS. 2C–J).

An important discovery of the present invention is that when trying to recognize a sequence of touches located ambiguously between keys, searching for key sequences whose relative geometric pattern matches the touch pattern greatly narrows the list of plausible key sequences. This is illustrated intuitively in FIG. 2. FIG. 2A shows a series of four touches as triangles t0, t1, t2, t3, on the left half of a QWERTY key layout 29. The distance between a given key and touch, herein referred to as the zero-order key/touch alignment error, is apparent by inspection. The radii of the dotted circles 30 indicate the distance from a touch to the nearest key. Touch t0 is roughly equidistant from keys 'D' and 'F', as indicated by t0's circle passing through both key symbols, and t0 is not far from 'C' or 'V' either. A 'nearest key' recognizer would associate t0 with 'D', but with little confidence. If t0 was just a bit farther right, 'F' would become the nearest choice. A nearest key recognizer also faces a tossup between 'E' and 'R' for t3, and cannot be terribly confident of recognizing t2 as 'R'. Touch t1 is the only touch close enough to a single key ('A') to be confidently interpreted as that key.

Figure 2B:
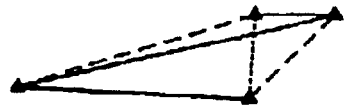
Figure 2C:
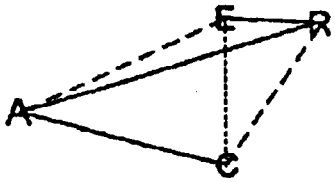
Figure 2D:
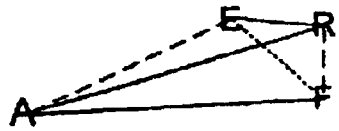
Figure 2E:
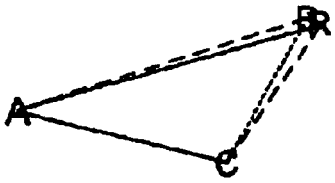
Figure 2F:
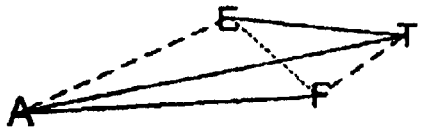
Figure 2G:
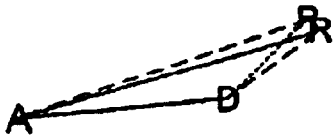
Figure 2H:
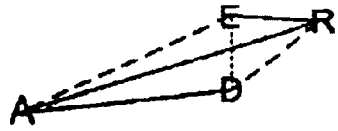
Figure 2I:
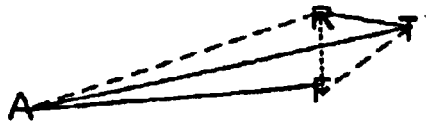
Figure 2J:
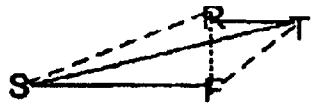

FIG. 2B illustrates the vectors separating successive touches. Solid lines 32 are 'first-order' vectors from t0 to t1, t1 to t2, and t2 to t3. Dashed lines 34 are 'second-order' vectors from t0 to t2 and t1 to t3. The dotted line 36 is the 'third-order' vector from t0 to t3. FIGS. 2'C'–'H' show corresponding key separate vectors for possible matching key sequences. In all cases but FIG. 2H and 2J, at least one of the key separation vectors clearly differs from a corresponding touch separation vector. For the 'CARE' hypothesis in FIG. 2C, the third-order 'C'–'E' vector is significantly longer than the corresponding t0–t3 vector. For the 'FARE' hypothesis in FIG. 2D, the second-order 'F'–'R' and third order 'F'–'E' vectors have clearly different angles than the corresponding t0–t2 and t0–t3 vectors. For the 'CARR' and 'DARR' hypotheses in FIGS. 2E and 2G, the first order 'R'–'R' vector will have length 0, quite different than the first order t2–t3 vector's length of one full key-spacing. For the 'FATE' hypothesis of FIG. 2F, the 'T'–'E' vector is now a full key-spacing longer than the t2–t3 vector. Even though all the hypotheses shown are nearly indistinguishable in terms of the zero-order alignment error between each touch and corresponding key, an improved typing recognizer that compares the touch separation and key separation vectors can quickly eliminate all but hypotheses 'DARE' and 'FRST' in FIGS. 2H and 2J. The final decision can be made based upon 'DARE's smaller zero-order, absolute error between t1 and 'A' than between t1 and 'S'. In even more ambiguous cases, a language model can help choose English words (like 'DARE' instead of 'FRST') from the list of remaining hypotheses.

Since typists expect the symbol of each touched key to appear on the host computer screen immediately after each corresponding finger stroke, a typing recognizer cannot wait for an entire touch sequence to complete before choosing the best key sequence. In a preferred embodiment of this invention, the recognizer module decodes the touch sequence incrementally, extending key hypothesis sequences by one key each time a new touch is detected. This process will form a hypothesis tree whose nodes are individual key hypotheses. It is important to note that related art 'nearest key' recognizes need not construct a hypothesis tree since they assume that finger placement errors from each keystroke are statistically independent.

Figure 3:
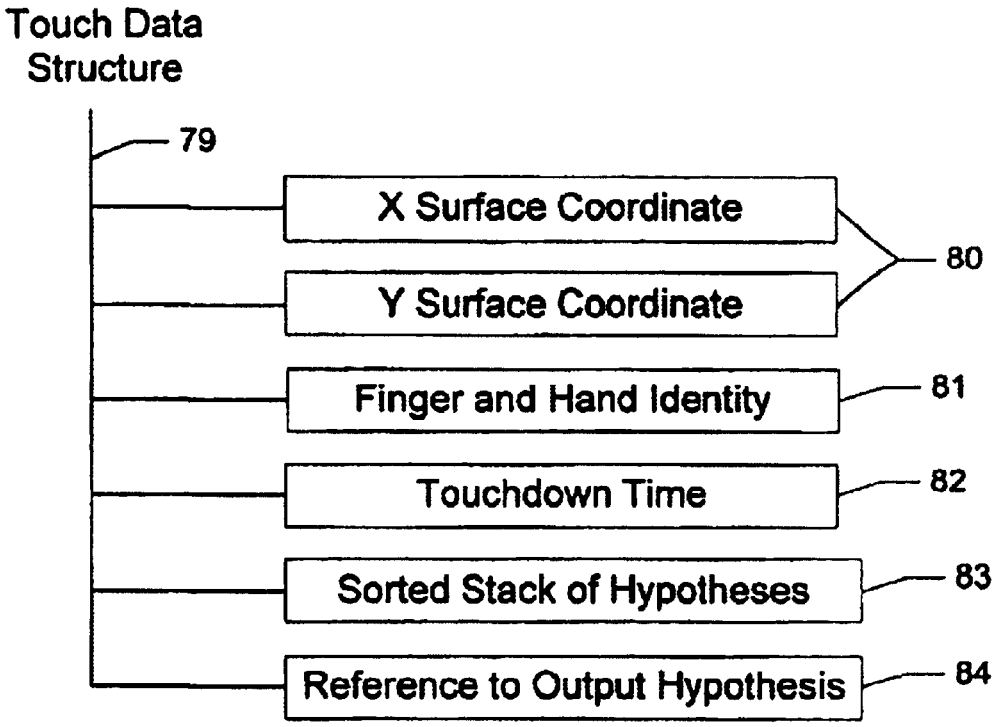
FIG. 3 illustrates the contents of the touch data structure used to store measured touch parameters, a decoding stack, and key finally output for a touch.

FIG. 3 lists the basic parameters the recognizer needs to store in each touch data structure 79. A ring or chain of such data structures ordered by touchdown time represents a touch sequence. Each touch data structure 79 must contain the touch's x and y surface coordinates 70 as reported by the touch sensors. These should estimate the center of the touch, which for proximity or pressure sensors is typically computed as the centroid of fingertip flesh contacting the surface. To help lookup the home row key of each touch from a resting hand, each touch data structure should have a copy of the hand and finger identity 71 estimated for the touch by the contact tracking and identification module 10. To keep track of the recency of past touches, the touch data should also include the finger touchdown time or press time 72. For compressible surfaces, this should correspond to the time the finger stroke bottomed out. The touch release time 73 should be set to either the time of finger liftoff from the surface or the current system time if the finger is still touching. To aid in decoding the most likely hypothesis sequence, all hypotheses caused by a touch will be inserted into a stack 76 and sorted so that the hypothesis with the best cumulative metric 98 rises to the top of the stack. Finally, to support undoing preliminary key outputs, the touch structure should maintain a reference 77 to the hypothesis whose key gets output in response to the touch. This reference will be null until a key is chosen to be output through the host communications interface 16.

Figure 4:
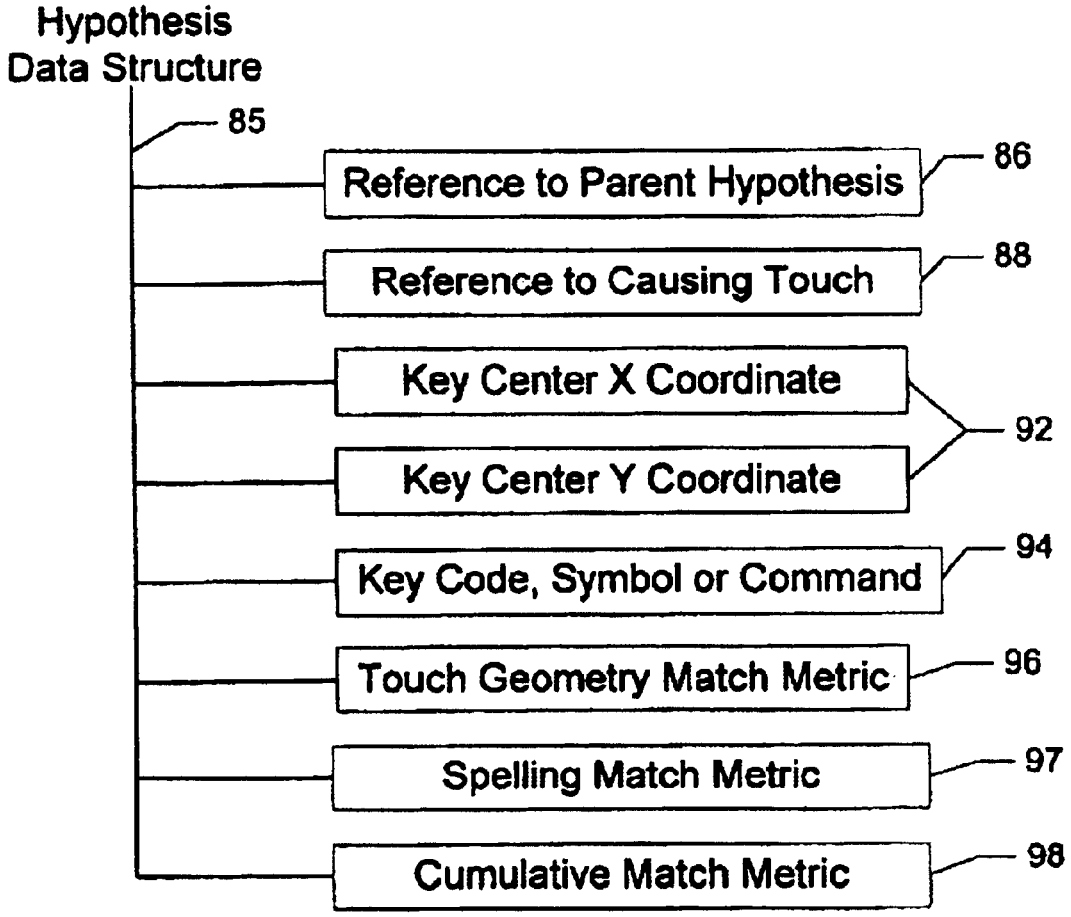
FIG. 4 illustrates the contents of the hypothesis data structure that serves as nodes of the hypothesis trees for the present invention.

FIG. 4 shows that to establish the tree structure, each hypothesis data structure 85 needs a reference 86 to its parent hypothesis from the previous touch. For the very first touch, this reference will be null, representing the root of the hypothesis tree. Having a reference to the data structure 88 of the touch causing the hypothesis is also convenient. The key center coordinates 92, and key code, symbol or command to be output 94, are retrieved from the key layout according to which key the hypothesis represents. Once computed, a measure of the match between the touch pattern and key pattern represented by the key hypothesis and its parent sequence will be stored as the geometry match metric 96. Though the embodiment presented herein formulates this geometry match metric as a cost to be minimized, it can just as easily be formulated as a probability to be maximized and remain well within the scope of this invention. It will be added in step 222 of FIG. 7 to the parent 86 hypothesis' cumulative match metric to obtain a new, extended cumulative match metric 98 for the sequence. In embodiments that include a spelling model, each hypothesis data structure 85 will also need to hold a spelling match metric 97. The spelling match metric may also be formulated as either a bad spelling cost to be minimized or a character transition probability to be maximized.

Figure 5:
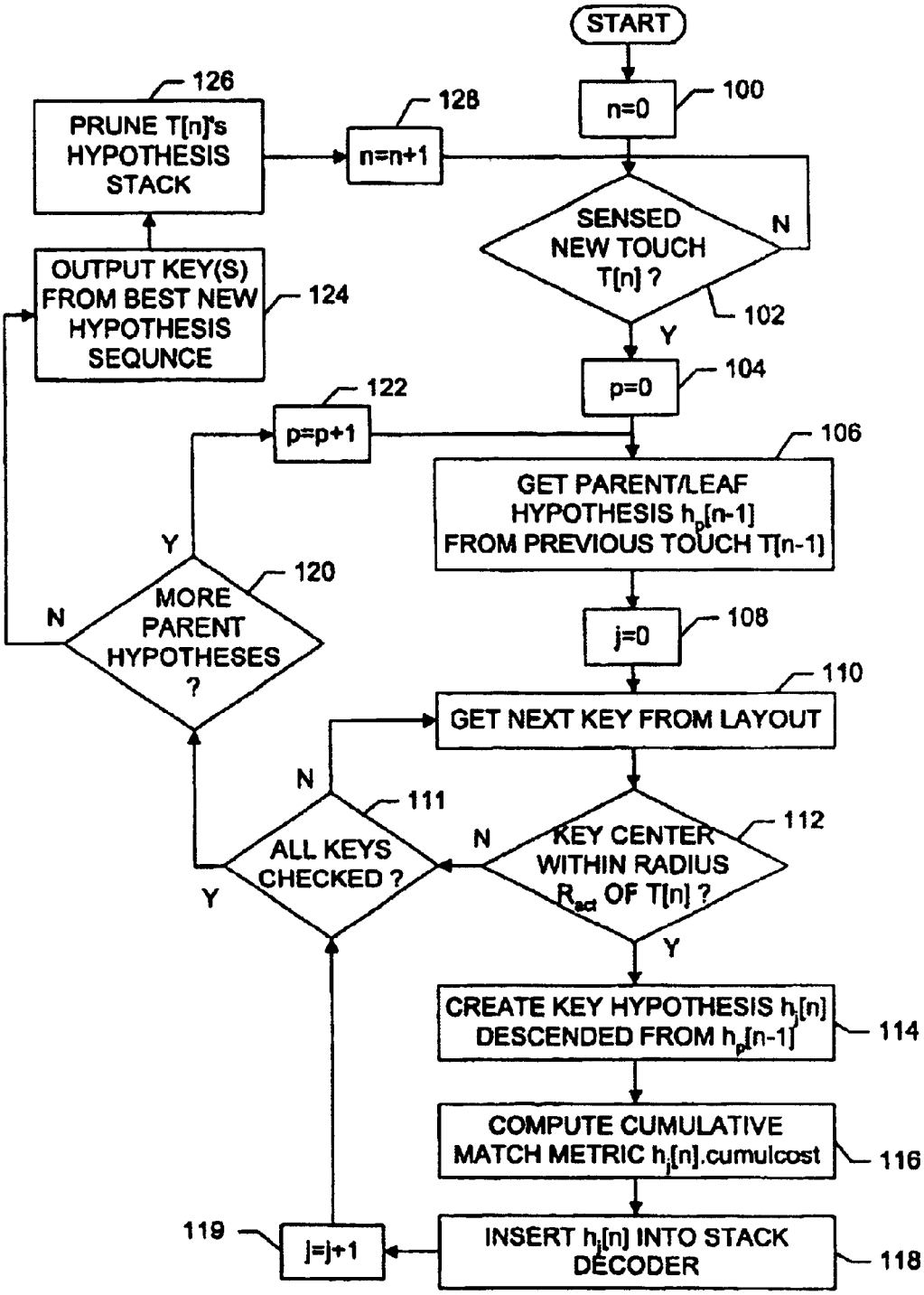
FIG. 5 is a flow chart illustrating the preferred embodiment of key hypothesis tree generation according to the present invention.

FIG. 5 is a flowchart illustrating the preferred embodiment of the hypothesis tree extension, evaluation, and decoding processes. Step 100 shows that the typing recognizer starts up with the touch count n set to 0 and the hypothesis tree empty. Decision diamond 102 waits for a new touch to be detected by the sensors and recorded as T[n], the newest touch data structure 79 of the chain. We will use the pseudo-code notation T[n].x and T[n].y for the touch coordinates 70. Step 104 resets the parent hypothesis index p to 0. Step 106 retrieves a parent hypothesis $h_p[n-1]$ data structure 85 associated with the previous touch T[n−1]. In the case that n equals 0, step 106 simply sets the parent hypothesis to null, representing the root of the empty tree. Step 108 resets the new hypothesis counter j to 0. Step 110 picks a key from the key layout, an array of key coordinates and symbols that describes the arrangement of keys across the surface. Decision diamond 112 tests whether the key center is within a maximum activation radius $R_{act}$ of the new touch T[n]'s surface coordinates. If the key is too far away, it need not be evaluated further, and decision diamond 111 will pick another key from the layout 110 until all keys' in the vicinity of the touch have been hypothesized. About one standard key-spacing (~2 cm or ¾" inch) is sufficiently large for $R_{act}$, but $R_{act}$ can be bumped up for oversize keys like Space, Shift, and Enter. Choosing $R_{act}$ too large wastes computation by hypothesizing keys that are nowhere near the finger touch and that the typist clearly did not intend to hit. Choosing $R_{act}$ too small limits the amount of hand drift that the typing recognizer can correct for.

Figure 7:
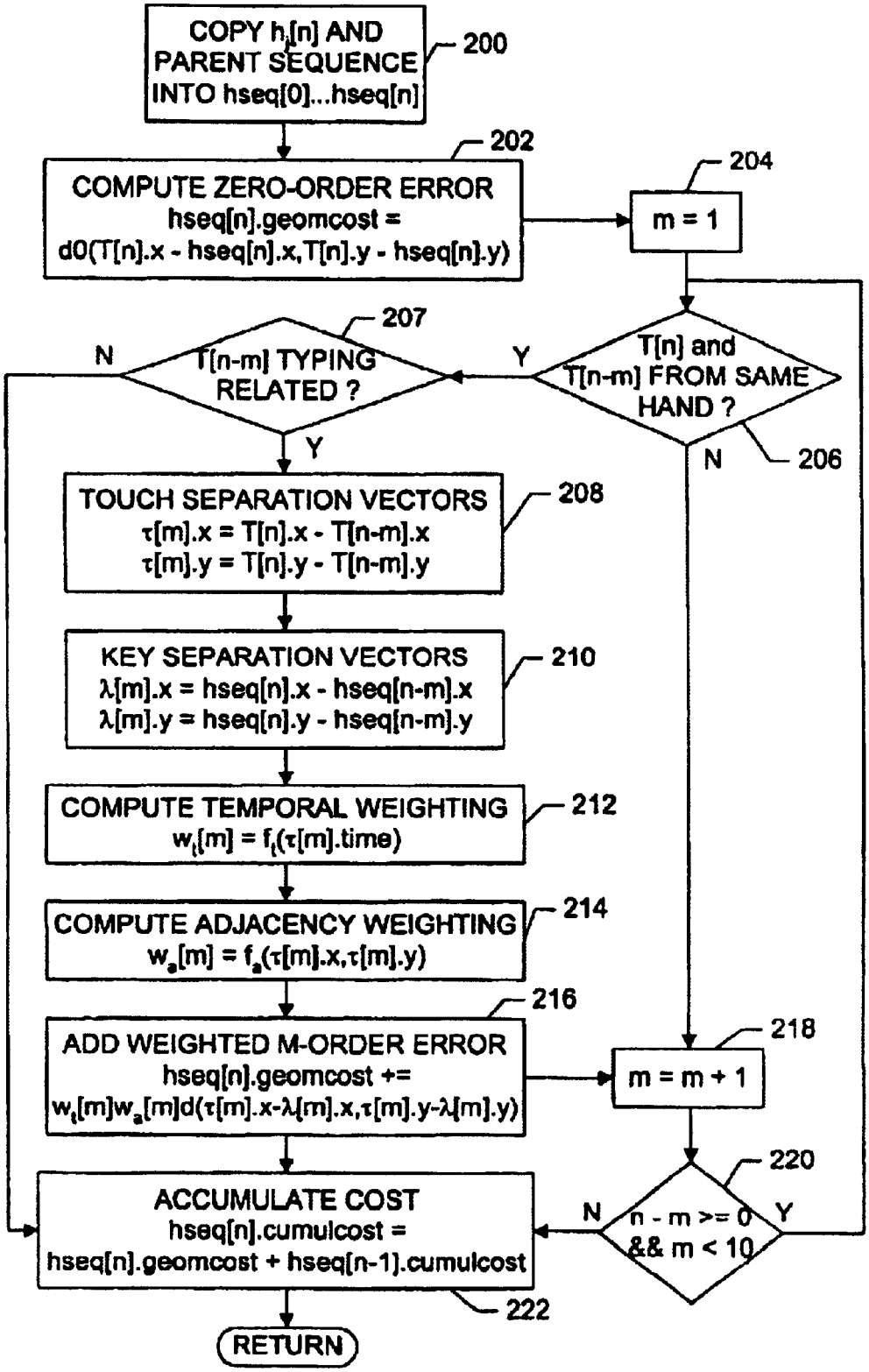
FIG. 7 is a flow chart illustrating the steps for computing the geometry match metric of each key hypothesis.

If a key is within the radius $R_{act}$ of the new touch, step 114 creates a new hypothesis $h_j[n]$ (using data structure 85) descended from the current parent $h_p[n-1]$. The new hypothesis' parent hypothesis reference 86 is set accordingly. Block 116 evaluates how well the new key hypothesis $h_j[n]$ and its parent sequence matches the touch sequence T[0] . . . T[n]. FIG. 7 will describe this critical block in more detail. Step 118 inserts the new hypothesis $h_j[n]$ into T[n]'s stack 76, which is sorted such that hypotheses with the best cumulative match metric (either lowest sum of costs or highest product of probabilities) rise to the top.

Once hypotheses descended from parent $h_p[n-1]$ have been generated for all keys near the touch T[n], decision diamond 120 decides whether the previous touch T[n−1]'s stack 76 contains additional parent hypotheses that need to be extended. If so, the parent hypothesis index p is incremented in step 122, and steps 106–122 repeat for the next parent. Once all parent hypotheses have been extended, block 124 actually outputs the best hypothesis sequence as described further in FIG. 8. Step 126 prunes from the tree those hypotheses whose cumulative match metric is already so poor that they are very unlikely to spawn best hypotheses in the future. This prevents exponential growth of the hypothesis tree by discarding clearly had hypotheses but preserving competitive hypotheses that might become parents of the best hypothesis for a future touch. The most efficient pruning method is to start at the bottom of T[n]'s stack 76 and discard all hypotheses whose cumulative metric is not within a future cost margin of the top (best) hypothesis's cumulative match metric. When all of a parent's child hypotheses have been discarded the parent is discarded as well. The pruning step 126 completes all processing of touch T[n], leaving step 128 to increment the touch index n so decision diamond 102 can resume waiting for the next touch.

Working together, steps 118, 124, and 126 constitute a stack decoder. They sort all of the new hypotheses for the current touch T[n] according to their cumulative match metric, choose the lowest cost sequence that winds up at the top of the stack as the best hypothesis sequence to output, and prune the implausible sequences at the bottom of the stack whose costs are much greater than the current best sequence. The stack decoder is a well-known method in the speech recognition, handwriting recognition, and digital communications arts for finding the optimal path through a hypothesis tree. For example, see F. Jelinek, Statistical Methods for Speech Recognition (published by The MIT Press, pages 93–110, 1997). Those skilled in the art will recognize that a basic Viterbi decoder would only be appropriate in place of the stack decoder if the touch geometry metric only included first order separation vectors. Including higher order separation vectors as is necessary to get a wholesome hand drift estimate makes the touch cost dependent on more than the previous touch and thus violates the first-order Markov condition for basic Viterbi decoders.

Figure 6:
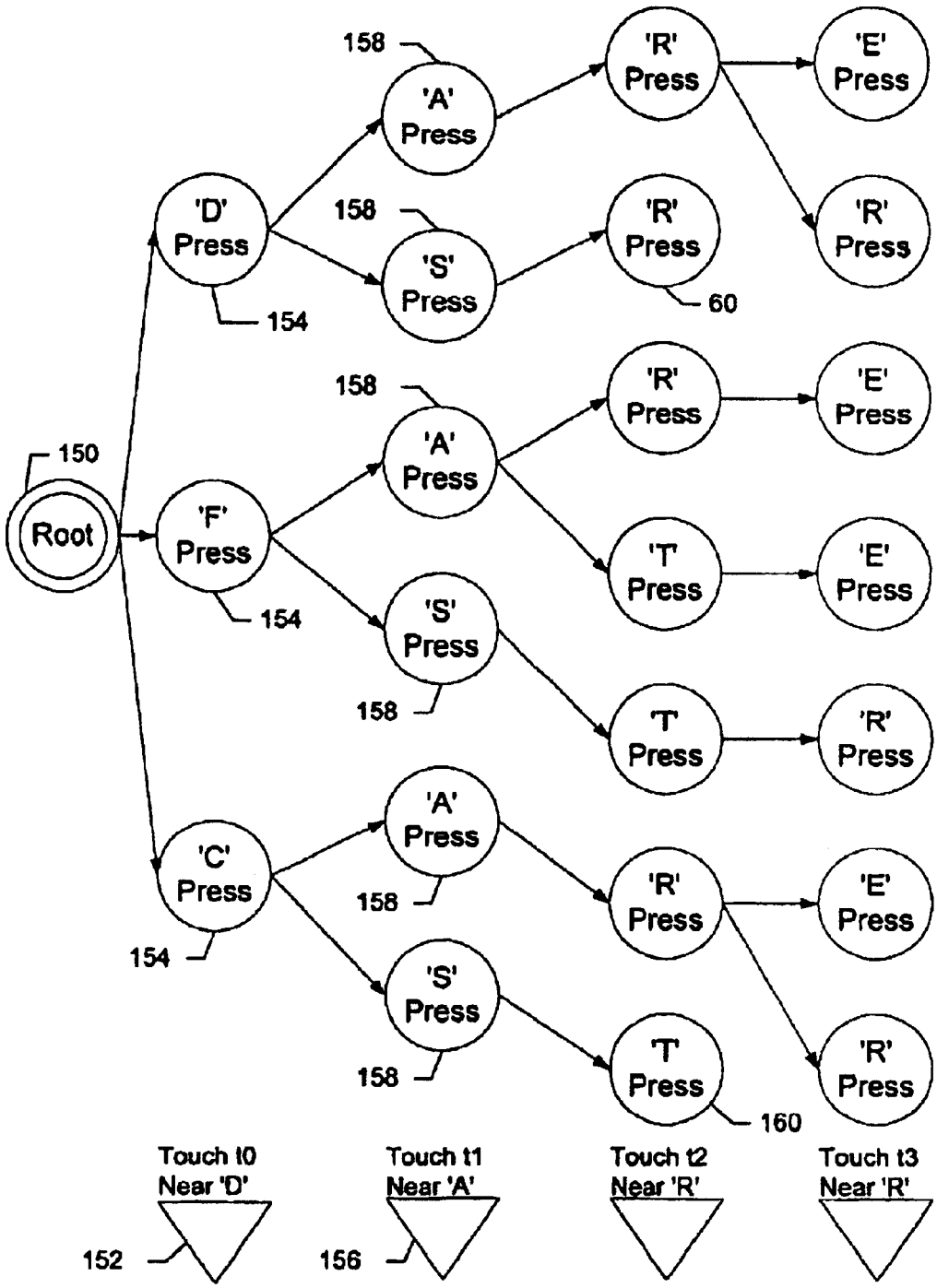
FIG. 6 is a diagram illustrating a hypothesis tree that could be generated by the process of FIG. 5 during recognition of the sample touch sequence in FIG. 2.

FIG. 6 shows an example of a hypothesis tree that the typing recognition process in FIG. 5 might generate while decoding the touch sequence described in FIG. 2. The tree starts empty while waiting for the first touch, consisting only of the null root 150. When touch t0 152 is detected, the typing recognizer will sprout hypotheses 154 for the keys 'D', 'F', and 'C' neighboring t0. Because the sequence so far contains only one touch, the match metric for these first keys will only include the zero-order, key/touch alignment error distance. In this case, the typing recognizer would be ready to output the 'D' key since, referring to FIG. 2A, 'D' is closest to t0. When touch t1 arrives 156, each hypothesis for t0 branches into hypotheses 158 for the keys nearest t1, namely 'A' and 'S'. The match metric for these t1 hypotheses can include both the zero-order key/touch alignment error and first-order separation vectors between t1 and t0. With a second touch, the typing recognizer is ready to start picking the best hypothesis sequence. To do so, for each t1 hypothesis it must compute a cumulative cost that also includes the cost of the parent to hypothesis. The t1 hypothesis with lowest cumulative cost will be selected, in this case 'DA'. Since 'D' was just output, only 'A' need be sent to the host.

In case the previous touch's output had been some key other than 'D', say 'F', the preliminary 'F' output would need to be undone and replaced with 'D' by sending a Backspace or Erase key followed by 'DA' to the host. The hypothesis tree extensions and output of best sequence would continue similarly for the t2 and t3 touches, except that the match metrics for these touches would include second and third-order separation vectors, respectively. Pruning of hypothesis chains 160 that accumulate relatively high total costs prevents the tree from growing exponentially as more touches occur.

The flowchart in FIG. 7 illustrates how the preferred embodiment of the typing recognizer evaluates the quality of the match between a hypothesized key sequence and the corresponding touch sequence. This expanded flowchart corresponds to step 116 of FIG. 5. For the convenience of those skilled in the art, the evaluation process is also shown below as pseudocode:

```
Copy hj[n] and its parent hypothesis sequence into hseq[n]. . .hseq[0]
for (m=0; m < 10 && n−m >= 0; m++) {
    if (m == 0) {//zero-order key/touch alignment error
        hseq[n].geomcost = d0(T[n].x − hseq[n].x,T[n].y − hseq[n].y)
        continue;
    } else if (T[n].hand_identity != T[n−m].hand_identity)
        continue;
    else if (T[n−m] not keystroke or resting finger)
        break;
    τ[m].x = T[n].x − T[n−m].x //touch separation vectors
    τ[m].y = T[n].y − T[n−m].y
    λ[m].x = hseq[n].x − hseq[n−m].x //key separation vectors
    λ[m].y = hseq[n].y − hseq[n−m].y
    wt[m] = ft(T[n].tpress−T[n−m].trelease)
    wa[m] = fa(τ[m].x,τ[m].y)
    hseq[n].geomcost +=wt[m]*wa[m]*
                    dM(τ[m].x−λ[m].x,τ[m].y−λ[m].y)
}
hseq[n].cumulcost = hseq[n].geomcost + hseq[n−1].cumulcost
```

For notational and computational convenience, step 200 copies the particular key hypothesis sequence to be evaluated into the array hseq[ ], starting at hj[n], the new leaf of the hypothesis tree, traversing back through its parent hypothesis references, and stopping at the root. Step 202 computes the zero-order, key/touch misalignment error and stores it as the hypothesis' geometry match metric 96, hseq [n].geomcost. The distance metric d0 determines how the hseq[n].geomcost scales with misalignment in the x and y dimensions. Those skilled in the art will realize that any of a Manhattan metric, Euclidean distance, squared Euclidean distance metric or other metrics would be suitable here. Related art 'nearest key' typing recognizers essentially stop with this zero-order alignment error as the final geometry metric, but the current invention includes higher order separation vector mismatches in the geometry metric via the following steps.

Step 204 initializes the order index m to 1. Since each hand's drift is presumed to be independent of the other's drift, only separation vectors for touches and keys typed within the same hand should be considered. Decision diamond 206 tests whether the m th previous hypothesized key hseq[n−m]is normally typed by the same hand as the currently hypothesized key hseq[n]. If not, hseq[n−m] presumably contains no information about the drift of the current hand, so the evaluation process skips m th-order separation vector computations and advances to step 218.

If both touches come from the same hand, decision diamond 207 decides whether the m th previous was actually typing related and thus a possible predictor of hand drift. Decision diamond 207 is particularly important for multi-touch systems that support non-typing synchronous touches such as chord taps, lateral chord slides, and hand resting. For instance, finger location at the beginning or end of pointing motions has nothing to do with subsequent typing drift, so decision diamond 207 should break the loop and skip to the final cost accumulation step 222 when it encounters a touch involved in pointing or any other sliding gesture. However, when typing on a surface, resting a hand (all fingers simultaneously) on home row in between words is quite convenient. Any slight misalignments between the home row keys and finger locations within the resting chord are a good predictor of hand/key misalignment during subsequent typing. Such resting finger locations can be incorporated into separation vector evaluation by having the synchronization detector 13 insert a chain of five special resting finger hypotheses into the hypothesis tree for any five nearly simultaneous touches deemed to be part of a hand resting on or near its home row keys. Each resting finger hypothesis is given key coordinates 92 from the home row key that its finger normally rests on. The hypothesis can look up its finger and hand identity 71 through its causing touch reference 88, and the identities can then index into a table of home row key center coordinates. Resting finger hypotheses are given a null key code 94 so that they produce no output signals to the host computer. For the purpose of key and touch separation vector matching, however, decision diamond 207 and steps 208–216 of FIG. 7 treat them as typing-related hypotheses. This subtle incorporation of resting hand alignment is an alternative to the key layout morphing method described by Westerman and Elias in U.S. patent application Ser. No. 09/236,513. The morphing method snaps the home row keys to the precise resting finger locations and shifts the rest of the key layout accordingly, thus removing any misalignment between the resting hand and the key layout, but is only practical for touch surfaces integrated onto a video display that indicates key location shifts to the user.

For typing-related touches from the same hand, step 208 creates the m th-order touch separation vector I.[m] by subtracting the spatial and temporal coordinates of the m th previous touch T[n−m] from the current touch T[n]. Likewise, step 210 creates the m th-order key separation vector Ï>>[m] by subtracting the layout coordinates of hseq [n−m]'s key from the currently hypothesized key hseq [n].

Step 212 computes the temporal confidence weighting $w_t$[m] that should decrease monotonically toward 0 with the time elapsed between the press 72 of the current touch, T[n] .tpress and release 73 of the m th previous touch, T[n−m] .trelease. The release time is used in case the preceding touch was caused by a hand that began resting near home row many seconds ago but lifted off quite recently. This temporal confidence weighting is meant to reflect the fact that old touches are poorer predictors of the current hand drift than newer touches. Those skilled in the art will realize that the exact downward slope for this weighting function can be empirically optimized by computing old and new touch drift correlations from actual typing samples. For instance, if the typing samples showed that the hand/layout alignment error remained fairly consistent over ten second periods, then the weighting function should be designed to stay well above 0 for touches less than ten seconds old.

Step 214 computes a touch adjacency weighting $w_a$[m] that should decrease monotonically toward 0 as the separation between the current and m th previous touch increases. The touch adjacency weighting is meant to reflect the fact that the separation between touches by the same finger or an adjacent finger, especially if the fingers have not reached far between the touches, is a better predictor of finger drift and overall hand drift than separation vectors for touches by non-adjacent fingers. Thus the second-order separation vector between t2 and t0 in FIG. 2B should be weighted more heavily than the long, first-order separation vector between t2 and t1. The adjacency weighting should be strongest when the m th previous touch occurred at the same surface location as the current touch, as this is a very strong indication both touches were intended to produce the same key. In this situation, the m th order key separation vector Ï>>[m] of the matching key sequence is expected to have zero length, and any hypothesized key sequences with a non-zero m th order vector length should be punished with a strongly weighted cost.

Step 216 adds to the geometry metric a cost for any mismatch between the m th-order touch separation vector Ï.[m] and the m th-order key separation vector Ï>>[m]. This incremental cost should generally increase with the magnitude of the difference between the two vectors. In the preferred embodiment, the square of the magnitude of the vector difference is weighted by the temporal confidence $w_t[m]$ and adjacency confidence $w_a[m]$ to obtain the m th-order cost increment. The squared Euclidean metric is preferred for dM because it favors sequences with uniformly small vector differences.

Step 218 increments the order index m so that decision diamond 220 can decide whether to continue evaluating higher order separation vectors. Ideally, the evaluation process would continue with previous touches all the way back to the tree root, where m reaches n, but in practice it is usually sufficient to include separation vectors from the ten or so most recent typing-related touches. Once decision diamond 220 decides m has reached its useful limit, flow falls through to the final step 222. Step 222 sets the sequence cumulative match metric $h_j[m]$.cumulcost to the sum of the new touch cost hseq[n]. geomcost and the parent's cumulative metric hseq[n−1].cumulcost.

It is also instructive to examine an alternative embodiment of geometry match metric evaluation that, mathematically, is the exact equivalent of and produces the same result as the process in FIG. 7. However, a different factoring of the computations lends this alternative embodiment a differently intuitive interpretation. For the convenience of those of ordinary skill in the art, this alternative embodiment is shown below as pseudocode:

```
Copy hj[n] and its parent hypothesis sequence into hseq[n]. . .hseq[0]
Allocate key/touch error array e[ ] for different orders
for (m=0; m < 10 && n−m >= 0; m++) {
    e[m].x = T[n−m].x − hseq[n−m].x //alignment errors
    e[m].y = T[n−m].y − hseq[n−m].y
    if (m == 0) {//zero-order key/touch alignment error
        hseq[n].geomcost = d0(e[0].x,e[0].y)
        continue;
    } else if (T[n].hand_identity != T[n−m].hand_identity)
        continue;
    else if(T[n−m] not keystroke or resting finger)
        break;
    wt[m] = ft(T[n].tpress − T[n−m].trelease)
    τ[m].x = T[n].x − T[n−m].x //touch separation vectors
    τ[m].y = T[n],y − T[n−m].y
    wa[m] = fa(τ[m].x,τ[m].y)
    hseq[n].geomcost +=wt[m]*wa[m]*
                    dM(e[0].x−e[m].x,e[0].y−e[m].y)
}
hseq[n].cumulcost = hseq[n].geomcost + hseq[n−1].cumulcost
```

Both embodiments compute the zero-order alignment error component the same, but this alternative embodiment restates the comparison between the m th-order key and touch separate vectors as a comparison between the new touch T[n]'s key/touch alignment error vector, c[0], and the m th previous touch T[n−m]'s key/touch alignment error vector, e[m]. This suggests that the stack decoder in either embodiment will tend to pick as the best sequence a key hypothesis sequence whose individual key/touch alignment error vectors at small yet consistent with one another. Clearly this alternative, equivalent embodiment falls well within the scope of this invention.

Figure 8:
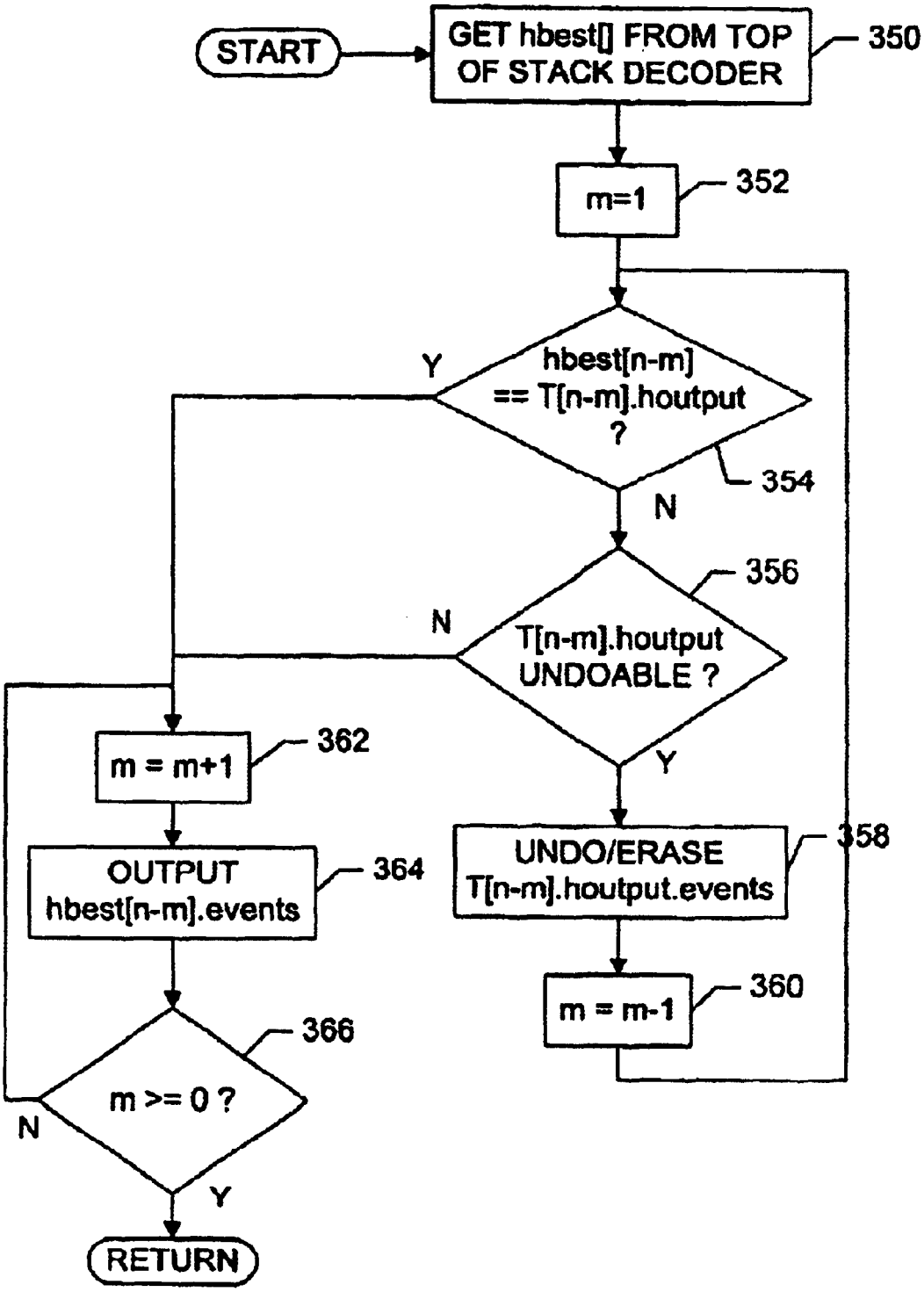
FIG. 8 is a flow chart illustrating the process that outputs the best new key hypothesis to the host computer, erasing as necessary previously output keys that differ from past keys in the current best sequence.

The output module in FIG. 8 is responsible for transmitting the key code, command or symbol 94 from the best hypothesis hbest[n] to the host application. This job is complicated by the fact that any keys sent for previous touches may not have come from hbest[n]'s parent sequence. This happens when, based on additional cost evaluations from a new touch, a stack decoder decides a totally different sequence is optimal than was considered optimal from previous touch information alone. This occurrence presents the human interface designer with a tough question—leave the old character sequence or partial word on the screen, even though the new key is likely to be from a different word, or erase characters that have already been displayed to the typist and replace them with the better sequence. This question is important because in rare instances the old characters may actually be what the user intended to type, in which case replacing them with the new, supposedly more optimal sequence will annoy and surprise the typist.

The preferred embodiment of the output module adopts a compromise. It will only replace characters within the current word (i.e. it will not go back past any space characters and change any completed words), and it will only replace these characters it they have only been typed within the last couple seconds, before the typist has had a chance to notice and correct the probably erroneous old characters himself. The output module starts with the current best hypothesis 350 hbest[n]from the stack decoder. Step 352 sets the previous output index m to 1. Decision diamond 354 checks whether the hypothesis 77 whose key was output for touch T[n−m] was hbest[n]'s parent hypothesis hbest[n−m]. If not, decision diamond 356 checks whether the old key was a word-breaking space or was output more than a few seconds ago. It not, step 358 sends an Erase or Backspace key to the host to undo the old character, and step 360 increments m to continue checking for a parent hypothesis that both the best sequence and previously sent sequence share. Once that parent is found or the search is aborted at a word boundary, step 362 begins sending the replacement key codes 94 from the hbest[ ] sequence, looping through step 363 to increment m until decision diamond finds that m has reached 0, and hseq [n]'s key code 94 has been transmitted.

Now that the preferred embodiment of the typing recognizer has been described, it is instructive to consider additional consequences of its design. One important consequence is that the key activated may not always be the key nearest the fingertip. Generating a neighboring key when the finger actually lands right on top of another key would be startling to the user. However, if the adjacency weightings are kept sufficiently low, the separation vectors cannot override a zero-order, key/touch position error near zero. Proper tuning of the adjacency weighting function ensures that separation vectors can only be decisive when the finger lies in a zone between keys, at least 2–4 mm (⅛"–¼") from the center of any key.

To further improve recognition accuracy when typing plain English or another predictable language, alternative embodiments of the typing recognizer may incorporate a spelling model. Such integration of spelling models into character recognizers is clearly taught in the handwriting recognition art (see, for example, the post-processing with Markov model and Dictionary in U.S. Pat. No. 5,812,698 to Platt et al. and the use of trigrams in U.S. Pat. No. 6,137,908), and will only be summarized here briefly. Basicly, the spelling model computes for each hypothesis a character transition cost that indicates whether the hypothesized key/character is building a dictionary word out of its parent hypothesis sequence. Costs will be high for character transitions that cannot be found in the dictionary. Command or editing keys can be given a neutral or zero spelling cost. Step 222 of FIG. 7 can then be modified to include the character transition cost weighted with the geometry cost in the cumulative cost total. Character transition costs need only be determining of the best sequence when different hypothesized key sequences have equally high touch geometry costs.

The case of a finger repetitively striking the same location halfway between keys is a good example of the advantages of considering touch sequence geometry in addition to zero-order alignment error, especially for typing recognizers that include a spelling model. Typists find it disconcerting if they strike the same location repeatedly yet the decoder outputs different neighboring characters. This can happen, say, if the user intended to type 'DDD' but the three consecutive finger strikes occur roughly between the 'S', 'E', and 'W' and 'D' keys. For a 'nearest key' recognizer with spelling model, the zero-order alignment errors for all four keys would be roughly equal, leaving the character transition costs to dominate and encourage the stack decoder to output common spelling sequences like 'WES', 'SEW', and 'DES.' But for a typing recognizer improved with touch geometry matching, only the key sequences 'SSS', 'EEE', 'DDD' and 'WWW' have small key separation vectors matching the small touch separations, so these sequences' relatively low geometry match costs would override the spelling model, causing one of them to be output. Even though the 'SSS' or 'EEE' sequences may not be what the typist intended, they are less disconcerting than a mixed output sequence like 'SEW' when the typist knows her finger was not hopping between keys. Thus separation vector matching can overcome misleading character transition costs to ensure the typist sees a consistent, homogeneous output sequence when a finger strikes approximately the same location repeatedly.

Though embodiments and applications of this invention have been shown and described, it will be apparent to those skilled in the art that numerous further embodiments and modifications than mentioned above are possible without departing from the inventive concepts disclosed herein. The invention, therefore, is not to be restricted except in the true spirit and scope of the appended claims.

What is claimed is:

1. A typing recognition apparatus for touch typing on surfaces with limited tactile feedback that compensates for finger and hand drift during typing and discourages any integrated spelling model from choosing dictionary words over unusual but carefully typed strings, the apparatus comprising:

a typing surface means that displays symbols indicating the locations of touchable keys;

touch sensor means that provides the surface coordinates of each touch by a typist attempting to strike said key symbols on said surface;

hypothesis tree generator means that extends existing key hypothesis sequences with hypotheses for keys in the neighborhood of each new touch;

pattern geometry evaluation means that computes geometry match metrics for the hypothesized key sequences by comparing separation vectors between the successive touch locations with separation vectors between the successively hypothesized key locations as well as by measuring the zero-order key/touch alignment error;

decoding means that finds the hypothesized key sequence with the best cumulative match metric; and, transmission means for communicating the symbols and commands represented by the best hypothesized key sequence to host computer applications.

2. The apparatus of claim 1 wherein a synchronization detection means inserts resting finger hypothesis into the hypothesis tree upon detection of a hand resting substantially on home row, and wherein said resting hypotheses are given for key separation vector computation purposes the coordinates of the home row key that their touch's identified finger normally rests upon.

3. The apparatus of claim 1 wherein a stack decoder is utilized as the particular decoding means.

4. The apparatus of claim 1 wherein the geometry match metric for a hypothesized key is substantially formulated as the squared distance between a touch and its hypothesized key plus the sum of squared differences between corresponding key and touch separation vectors of all valid orders.

5. The apparatus of claim 4 wherein the difference between a touch separation vector and the corresponding key separation vector is weighted in roughly inverse proportion to the touch time difference between the two touches from which the touch separation vector was computed.

6. The apparatus of claim 4 wherein the difference between a touch separation vector and the corresponding key separation vector is weighted less if the touch separation vector is large.

7. A method for recognizing typing from typing devices that sense lateral finger position but provide limited tactile feedback of key location, the method advantageously compensating for finger and hand drift during typing and discouraging any integrated spelling model from choosing dictionary words over unusual but carefully typed strings, wherein the method comprises the following steps:

forming a touch location and time sequence from the fingertip position at the end of each keystroke as measured by typing sensors;

computing a set of touch separation vectors of increasing orders from the location difference between the newest touch and previous touch in said touch location sequence;

generating a set of key hypothesis sequences for the given touch sequence, each hypothesis in a sequence being for a key near the location of the touch causing the hypothesis;

for each key hypothesis, computing a set of key separation vectors of increasing orders from differences between the position of the newest key and previous keys in the hypothesized sequence;

for each key hypothesis, computing a geometry match metric as a function of the magnitude of the zero-order touch/key alignment error as well as of the magnitudes of each order's touch and key separation vector difference;

combining the geometry match metrics from each hypothesis in a key hypothesis sequence into a cumulative match metric for the hypothesis sequence;

choosing the hypothesized key sequence with the best cumulative metric as the best hypothesized key sequence; and, transmitting the symbols and commands represented by the best hypothesized key sequence to a host computer for further action.

8. The method of claim 7 wherein the magnitude of each difference between a touch separation vector and the corresponding key separation vector is weighted in roughly inverse proportion to the time between the two touches from which the touch separation vector was computed.

9. The method of claim 7 wherein the magnitude of each difference between a touch separation vector and the corresponding key separation vector is weighted less if the touch separation vector is large.

10. The method of claim 7 wherein a synchronization detection means inserts resting finger hypothesis into the hypothesis tree upon detection of a hand resting substantially on home row, and wherein said resting hypotheses are given for key separation vector computation purposes the coordinates of the home row key that their touch's identified finger normally rests upon.

11. The method of claim 7 wherein the set of key hypothesis sequences are stored as a hypothesis tree that can extend the sequences upon reception of a new touch by sprouting new hypotheses.

12. The method of claim 11 wherein a stack decoder is utilized to find the best hypothesized key sequence.

13. A method for recognizing typing from typing devices that sense lateral finger position but provide limited tactile feedback of key location, the method advantageously compensating for finger and hand drift during typing and discouraging any integrated spelling model from choosing dictionary words over unusual but carefully typed strings, wherein the method comprises the following steps:

forming a touch location and time sequence from the fingertip position at the end of each keystroke as measured by typing sensors;

generating a set of key hypothesis sequences for the given touch sequence, each hypothesis in a sequence being for a key near the location of the touch causing the hypothesis;

for each key hypothesis, computing a key/touch alignment error vector as the difference between the location of the hypothesized key and the location of its causing touch;

for each key hypothesis, computing a geometry match metric as a function of the magnitude of the hypothesis' key/touch alignment error as well as of the magnitude of differences between the hypothesis' key/touch alignment error vector and that of preceding hypotheses in its sequence;

combining the geometry match metrics from each hypothesis in a key hypothesis sequence into a cumulative match metric for the hypothesis sequence;

choosing the hypothesized key sequence with the best cumulative metric as the best hypothesized key sequence; and, transmitting the symbols and commands represented by the best hypothesized key sequence to a host computer for further action.

14. The method of claim 13 wherein the magnitude of the difference between two hypotheses' key/touch alignment error vectors is weighted in roughly inverse proportion to the time between the two touches from which the touch separation vector was computed.

15. The method of claim 13 wherein the magnitude of the difference between two hypotheses' key/touch alignment error vectors is weighted less if the separation between the corresponding touches is large.

16. The method of claim 13 wherein a synchronization detection means inserts resting finger hypothesis into the hypothesis tree upon detection of a hand resting substantially on home row, and wherein said resting hypotheses are given for key/touch alignment error vector computation purposes the coordinates of the home row key that their touch's identified finger normally rests upon.

17. The method of claim 13 wherein the set of key hypothesis sequences are stored as a hypothesis tree that can extend the sequences upon reception of a new touch by sprouting new hypotheses.

18. The method of claim 17 wherein a stack decoder is utilized to find the best hypothesized key sequence.

*19. A typing recognition apparatus comprising:*

*a typing surface;*

*at least one touch sensor configured to provide surface coordinates of each touch by a typist to the typing surface;*

*a hypothesis tree generator configured to generate key hypothesis sequences from the surface coordinates of each touch; and*

*a pattern geometry evaluator configured to compute a geometry match metric for each of the key hypothesis sequences.*

*20. The typing recognition apparatus of claim 19 further comprising:*

*a decoder configured to select as a best hypothesized key sequence from among the key hypothesis sequences based on the computed geometry match metrics.*

*21. The typing recognition apparatus of claim 20 further comprising:*

*a transmitter configured to send at least one symbol or command represented by the best hypothesized key sequence.*

*22. A method for recognizing typing, the method comprising:*

*receiving a touch location and time sequence for a plurality of keystrokes;*

*generating a set of key hypothesis sequences for the plurality of keystrokes;*

*computing a geometry match metric for each key hypothesis sequence; and*

*choosing a best hypothesized key sequence based on the geometry match metrics.*

*23. A typing recognition apparatus that compensates for finger and hand drift during typing on a touch-sensitive surface, the apparatus comprising:*

*sensor scanning hardware configured for providing surface coordinates of each touch received on the touch-sensitive surface; and*

*a processor programmed for*

*extending existing key hypothesis sequences with hypotheses for keys in a neighborhood of each new touch,*

*computing geometry match metrics for the hypothesized key sequences by comparing touch separation vectors between successive touch locations with key separation vectors between successively hypothesized key locations and measuring zero-order key/touch alignment error,*

*computing a character transition cost for each of the hypothesized key sequences based on whether the hypothesized key sequence is building a dictionary word,*

*selecting a best hypothesized key sequence from the hypothesized key sequences, the best hypothesized key sequence having a best cumulative match metric formulated from the geometry match metric and the character transition cost, and*

*communicating symbols and commands represented by the best hypothesized key sequence to a host computer application.*

*24. The typing recognition apparatus of claim 23, further comprising a touch-sensitive surface configured for displaying symbols indicating locations of touchable keys.*

*25. The typing recognition apparatus of claim 23, wherein the character transition cost is high when a dictionary match is not found.*

*26. The typing recognition apparatus of claim 23, wherein the character transition cost is set to neutral or zero when the hypothesized key location is a command or editing key.*

*27. A method for compensating for finger and hand drift during typing on a touch-sensitive surface, comprising:*

*obtaining a touch location and time sequence for each detected touch in a touch sequence;*

*computing a set of touch separation vectors of increasing orders between the detected touches in the touch sequence;*

*generating a set of key hypothesis sequences for each touch in the touch sequence, each key hypothesis sequence associated with a key near the location of the touch;*

*for each key hypothesis sequence, computing a set of key separation vectors of increasing orders between the keys in the hypothesized key sequence;*

*for each key hypothesis sequence, computing a geometry match metric as a function of a magnitude of a zero-order touch/key alignment error and the magnitudes of each order's touch and key separation vector difference;*

*computing a character transition cost for each of the hypothesized key sequences based on whether the hypothesized key sequence is building a dictionary word;*

*selecting a best hypothesized key sequence from the hypothesized key sequences, the best hypothesized key sequence having a best cumulative match metric formulated from the geometry match metric and the character transition cost, and*

*transmitting symbols and commands represented by the best hypothesized key sequence to a host computer for further action.*

*28. The method of claim 27, further comprising detecting the touches in the touch sequence on a touch-sensitive surface configured for displaying symbols indicating locations of touchable keys.*

*29. The method of claim 27, wherein the character transition cost is high when a dictionary match is not found.*

*30. The method of claim 27, wherein the character transition cost is set to neutral or zero when a hypothesized key location is a command or editing key.*

*31. A typing recognition apparatus comprising:*

*a typing surface;*

*at least one touch sensor integrated with the typing surface and configured to provide surface coordinates of each touch on the typing surface;*

*a hypothesis tree generator configured to generate key hypothesis sequences from the surface coordinates of each touch;*

*a pattern geometry evaluator configured to compute a geometry match metric for each of the key hypothesis sequences;*

*a dictionary selector configured to compute a character transition cost for each of the key hypothesis sequences based on whether the hypothesized key sequence is building a dictionary word; and*

*a decoder configured for selecting a best hypothesized key sequence from the hypothesized key sequences, the best hypothesized key sequence having a best cumulative match metric formulated from the geometry match metric and the character transition cost.*

*32. The typing recognition apparatus of claim 31, the typing surface configured for displaying symbols indicating locations of touchable keys.*

*33. The typing recognition apparatus of claim 31, wherein the character transition cost is high when a dictionary match is not found.*

*34. The typing recognition apparatus of claim 31, wherein the character transition cost is set to neutral or zero when a hypothesized key location is a command or editing key.*

*35. A method for recognizing typing, the method comprising:*

*receiving a touch location and time sequence for a plurality of keystrokes;*

*generating a set of key hypothesis sequences for the plurality of keystrokes;*

*computing a geometry match metric for each key hypothesis sequence;*

*computing a character transition cost for each key hypothesis sequence based on whether the key hypothesis sequence is building a dictionary word; and*

*selecting a best hypothesized key sequence from the hypothesized key sequences, the best hypothesized key sequence having a best cumulative match metric formulated from the geometry match metric and the character transition cost.*

*36. The method of claim 35, further comprising detecting the plurality of keystrokes on a touch-sensitive surface configured for displaying symbols indicating locations of touchable keys.*

*37. The method of claim 35, wherein the character transition cost is high when a dictionary match is not found.*

*38. The method of claim 35, wherein the character transition cost is set to neutral or zero when a hypothesized key location is a command or editing key.*

* * * * *